United States Patent
Namba et al.

(10) Patent No.: US 7,359,883 B2
(45) Date of Patent: Apr. 15, 2008

(54) LICENSE MANAGEMENT SYSTEM, LICENSE MANAGEMENT DEVICE, RELAY DEVICE AND TERMINAL DEVICE

(75) Inventors: Takaaki Namba, Nagoya (JP); Takashi Matsuo, Kawasaki (JP); Akio Higashi, Takatsuki (JP); Tohru Nakahara, Osaka (JP); Hiroki Murakami, Suita (JP); Masanori Nakanishi, Osaka (JP); Yasushi Uesaka, Sanda (JP); Kouji Miura, Matsubara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 645 days.

(21) Appl. No.: 10/257,353

(22) PCT Filed: Apr. 11, 2002

(86) PCT No.: PCT/JP02/03636

§ 371 (c)(1),
(2), (4) Date: Oct. 11, 2002

(87) PCT Pub. No.: WO02/086685

PCT Pub. Date: Oct. 31, 2002

(65) Prior Publication Data

US 2003/0140009 A1     Jul. 24, 2003

(30) Foreign Application Priority Data

Apr. 19, 2001   (JP) ............................. 2001-121161

(51) Int. Cl.
*H04K 1/00* (2006.01)

(52) U.S. Cl. ............................ 705/59; 705/51; 705/57; 726/1; 726/2; 726/3; 726/4; 726/5; 726/6; 726/7; 726/8; 726/9; 726/10; 726/11; 726/12; 726/13; 726/14; 726/15; 726/16; 726/17; 726/18; 726/19; 726/20; 726/21; 726/22; 726/23; 726/24; 726/25; 726/26; 726/27; 726/28; 726/29; 726/30; 726/31; 726/32; 726/33; 726/34; 726/35; 726/36

(58) Field of Classification Search .................. 705/51, 705/57, 59; 726/1–36
See application file for complete search history.

(56) References Cited

U.S. PATENT DOCUMENTS

| 5,920,861 | A | 7/1999 | Hall et al. |
| 6,820,063 | B1* | 11/2004 | England et al. ............... 705/54 |
| 2002/0019977 | A1* | 2/2002 | Matsuzuki ................... 717/170 |
| 2002/0032763 | A1* | 3/2002 | Cox et al. ................... 709/223 |
| 2002/0129235 | A1* | 9/2002 | Okamoto et al. ........... 713/150 |
| 2003/0078853 | A1* | 4/2003 | Peinado et al. ............... 705/26 |

FOREIGN PATENT DOCUMENTS

| EP | 0 715 246 | 6/1996 |
| EP | 1 079 628 | 2/2001 |
| JP | 10-063364 | 3/1998 |
| JP | 2000-048076 | 2/2000 |
| JP | 2000-293439 | 10/2000 |
| JP | 2001-43193 | 2/2001 |
| JP | 2002-297451 | 10/2002 |

* cited by examiner

*Primary Examiner*—Bradley B. Bayat
(74) *Attorney, Agent, or Firm*—Wenderoth, Lind & Ponack, L.L.P.

(57) ABSTRACT

A management device of a license management system acquires a usage request of a content from an SD card or a printer via a relay device, analyzes the acquired usage request, acquires usage environment information of the SD card or the printer from the relay device, analyzes the acquired usage environment information, generates license information including a usage rule corresponding to the analysis results of the usage request and the usage environment information, generates instruction information indicating how to handle the license information in the relay device based on the analysis result of the usage environment information, embeds the generated instruction information in the license information, and sends the license information to the relay device. The relay device receives the license information in which the instruction information is embedded, and transfers the received license information to the SD card or the printer according to the instruction information which is embedded in the license information with performing certain processing or without performing any processing to the license information.

16 Claims, 24 Drawing Sheets

Fig. 2A

| Equipment Name | Example of Copyright Protection Method (Management processing) |
|---|---|
| Management Device | Can perform processing of plural-time right (such as N-time printing right, etc.) |
| Relay Device | Perform processing minimum unit of right as usage rule (such as 1-time printing right, etc.) |
| | Acquire usage rule via network for 2- or more-time usage |
| Content Usage Terminal | Can perform processing of plural-time right (such as N-time printing right, etc.) |

Fig. 2B
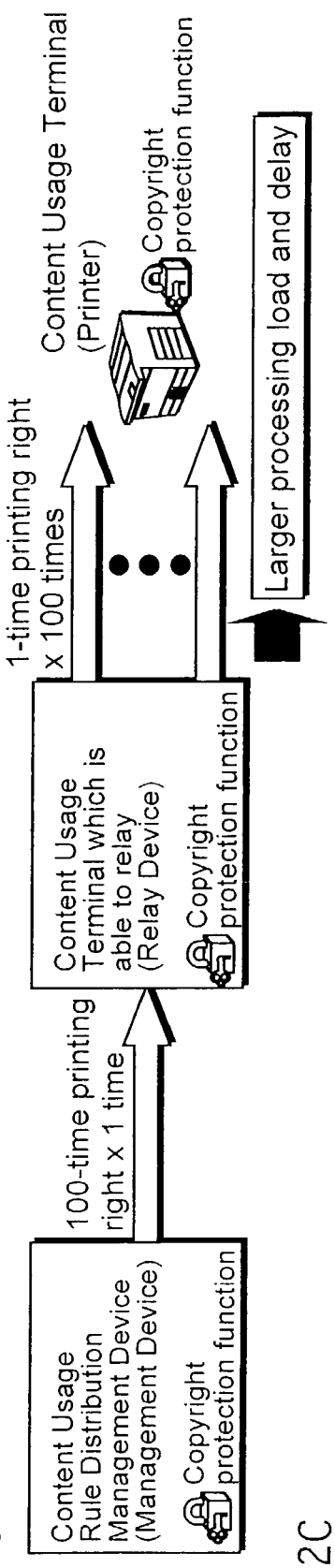

Fig. 2C
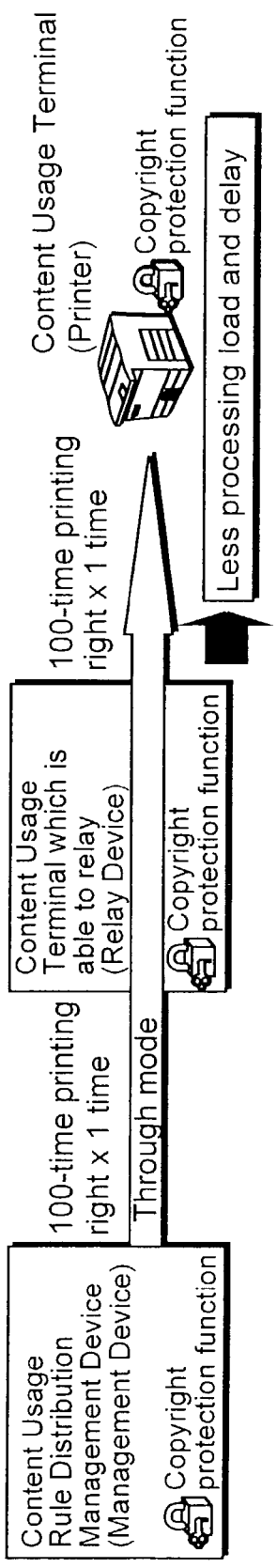

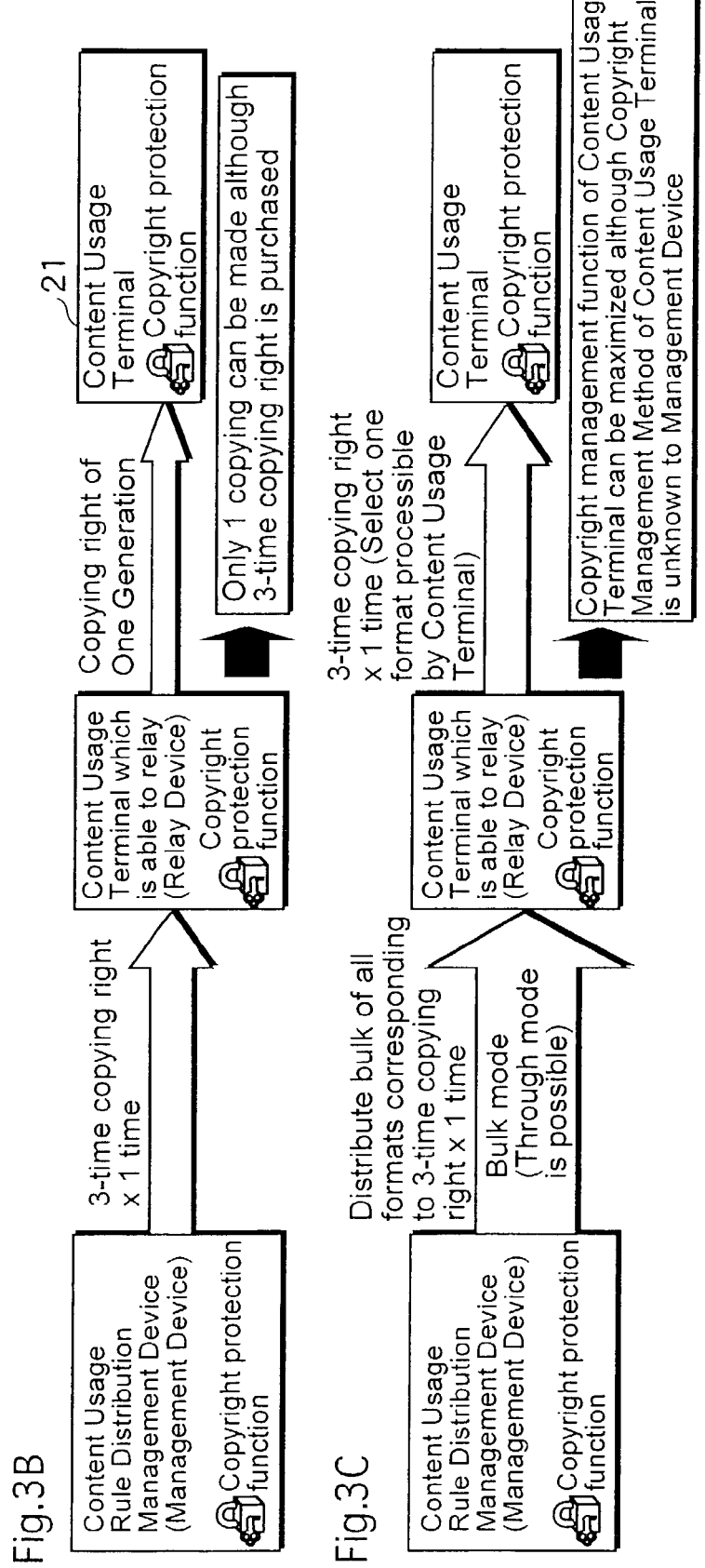

Fig. 7

Usage Environment Information (Content Usage Terminal)

| Parameter Name | Contents | |
|---|---|---|
| Content user ID (8 bytes) | 0x1 | |
| Terminal ID (16 bytes) | 0x20 | |
| Copyright protection function type (8 bytes) | Version | |
| | Playback (1 time) | |
| | Moving | |
| Reservation (16 bytes) | Usage history, etc. | |

Fig. 8

| Usage Environment Information | Parameter | Contents of Relay Device 30 | Contents of Storage Medium 40 | Contents of Terminal 50 |
|---|---|---|---|---|
| | Content user ID (8) | 0x2 | 0x3 | 0x4 |
| | Terminal ID (16) | 0x30 | 0x40 | 0x50 |
| | Copyright protection function type (8) | · Version<br>· Playback (1 time)<br>· Moving | · Version<br>· Playback (plural times are possible)<br>· Moving | · Unknown (Version<br>Printing(plural times are possible)) |
| | Reservation (16) | Usage history, etc. | Usage history, etc. | Usage history, etc. |

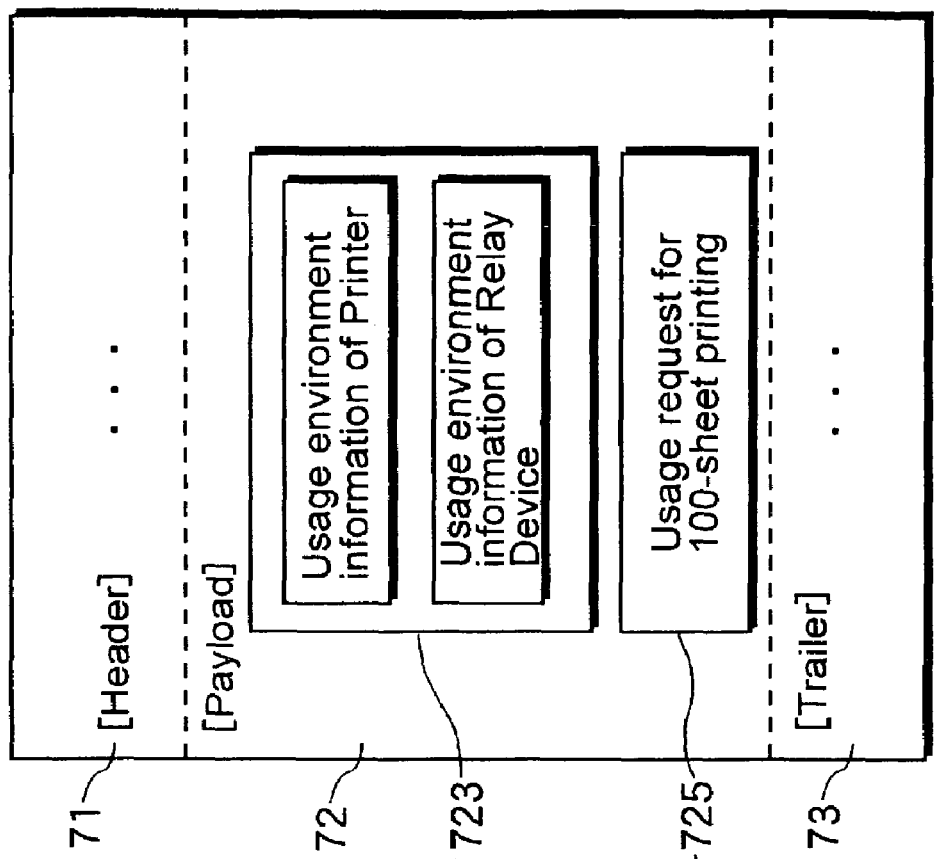
Fig. 10B  Usage Request from Printer
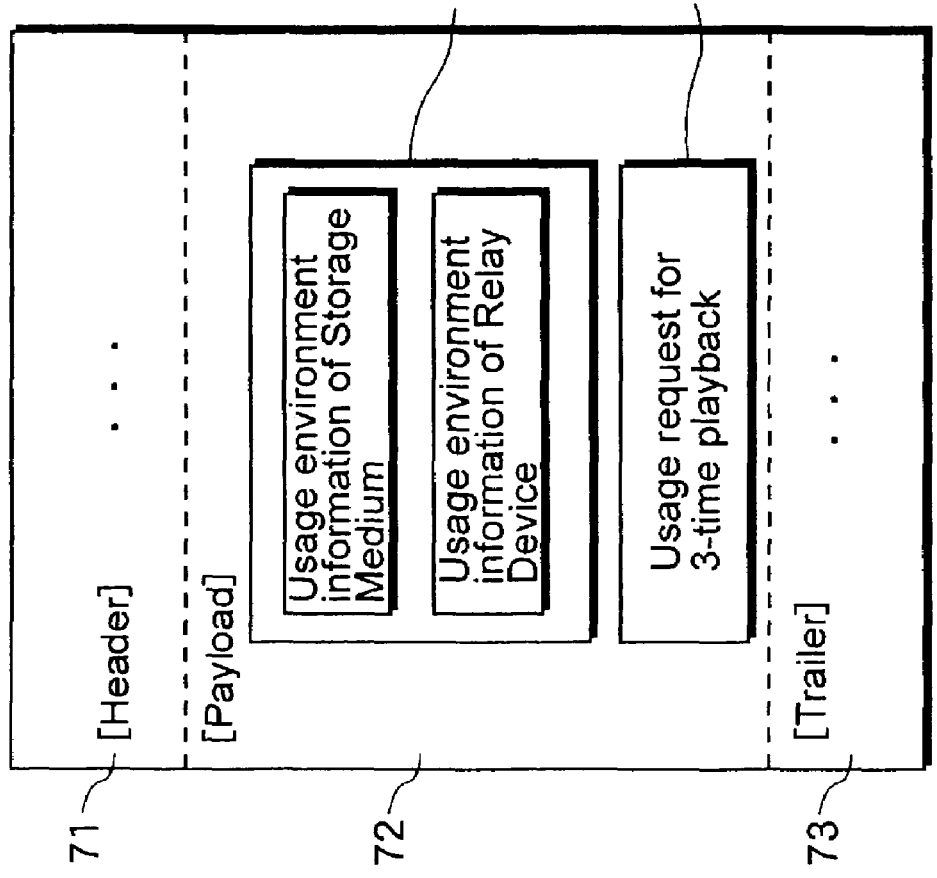
Fig. 10A  Usage Request to Storage Medium

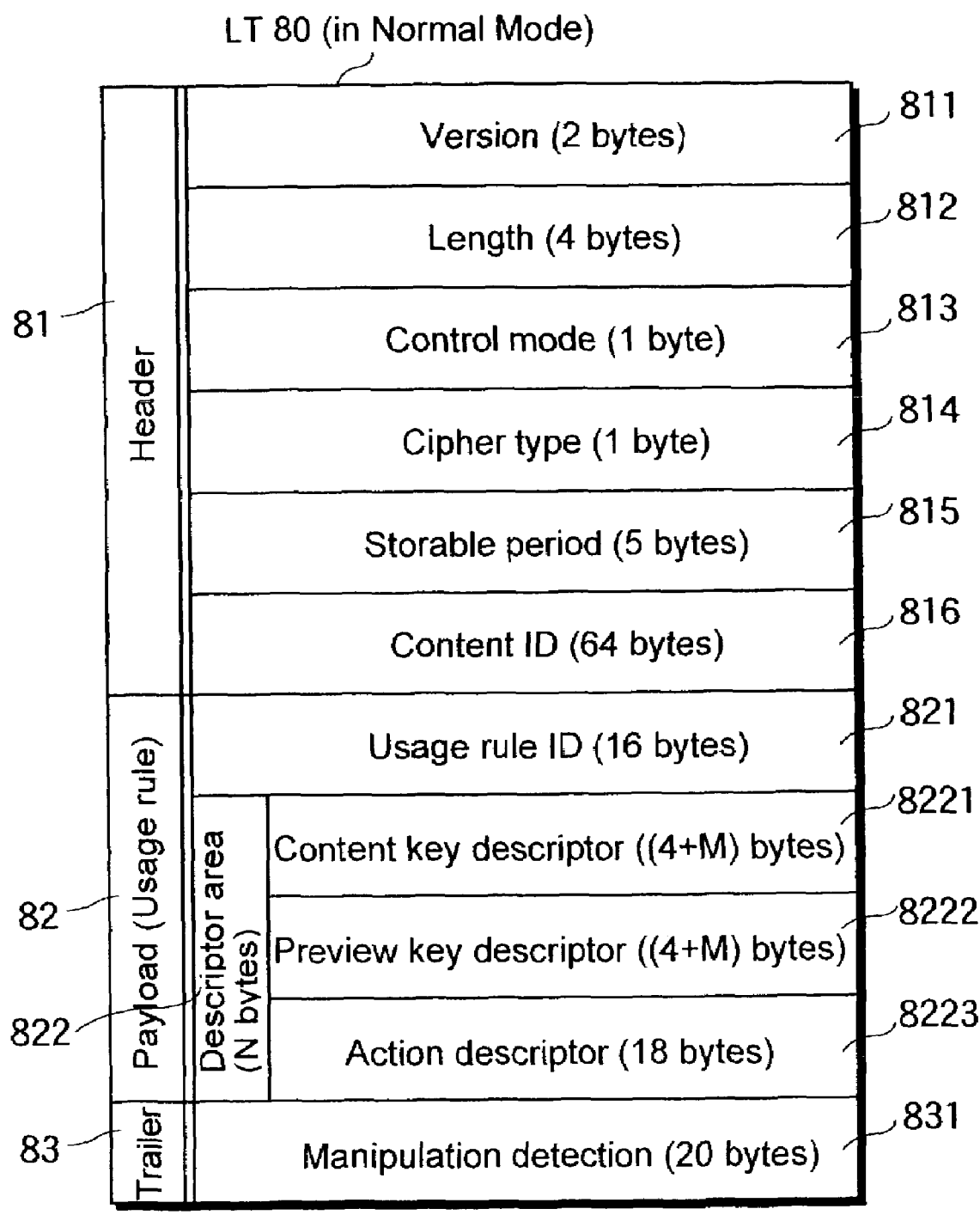

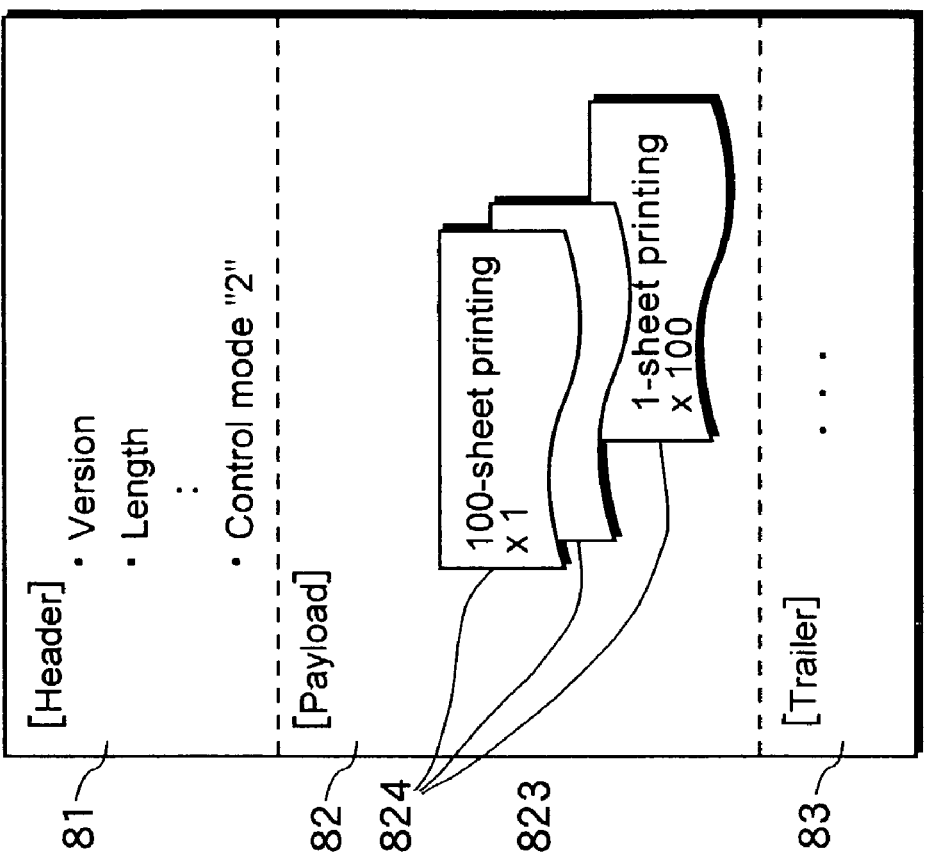
Fig. 23B Bulk Mode LT
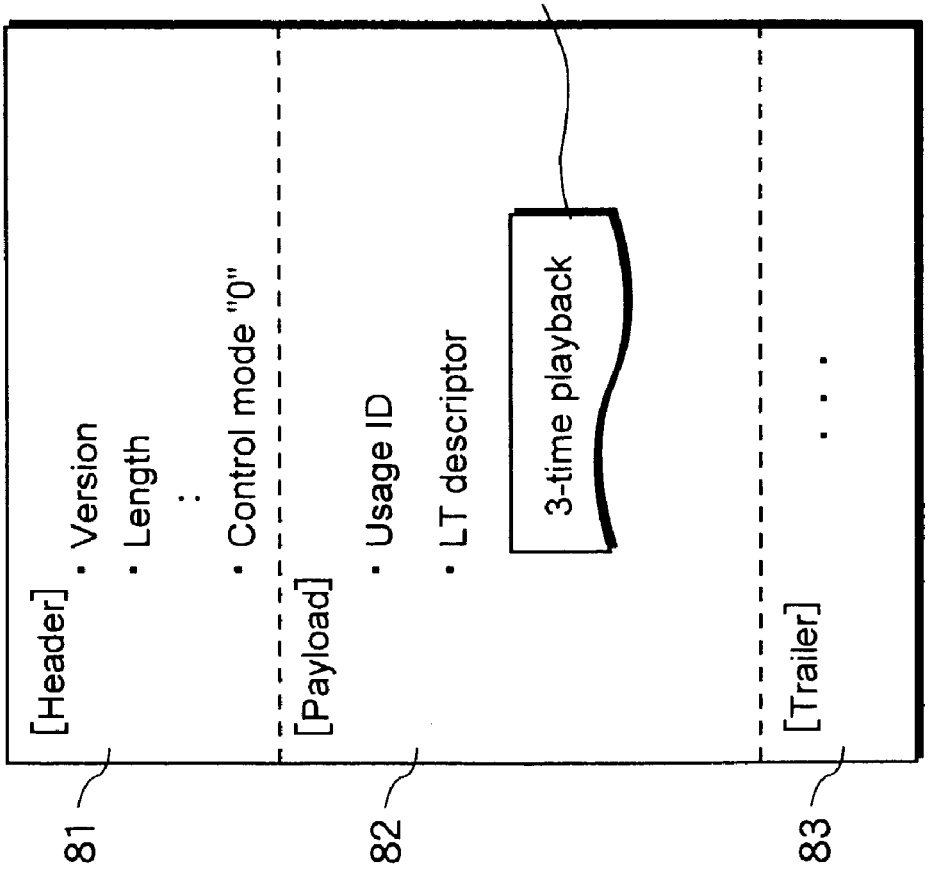
Fig. 23A Through Mode LT

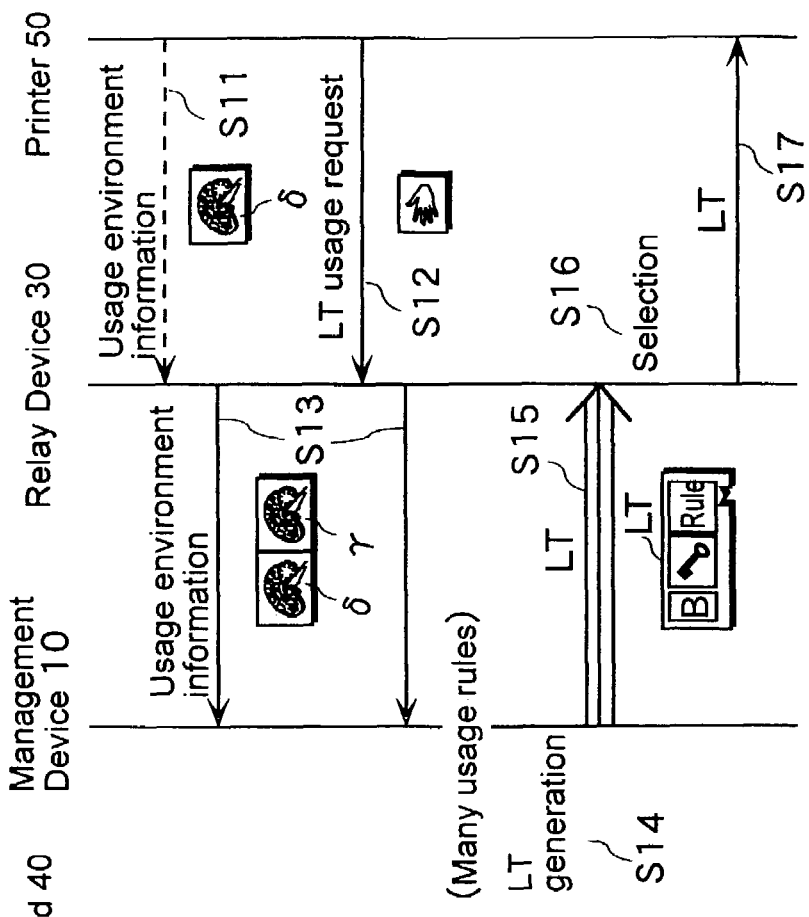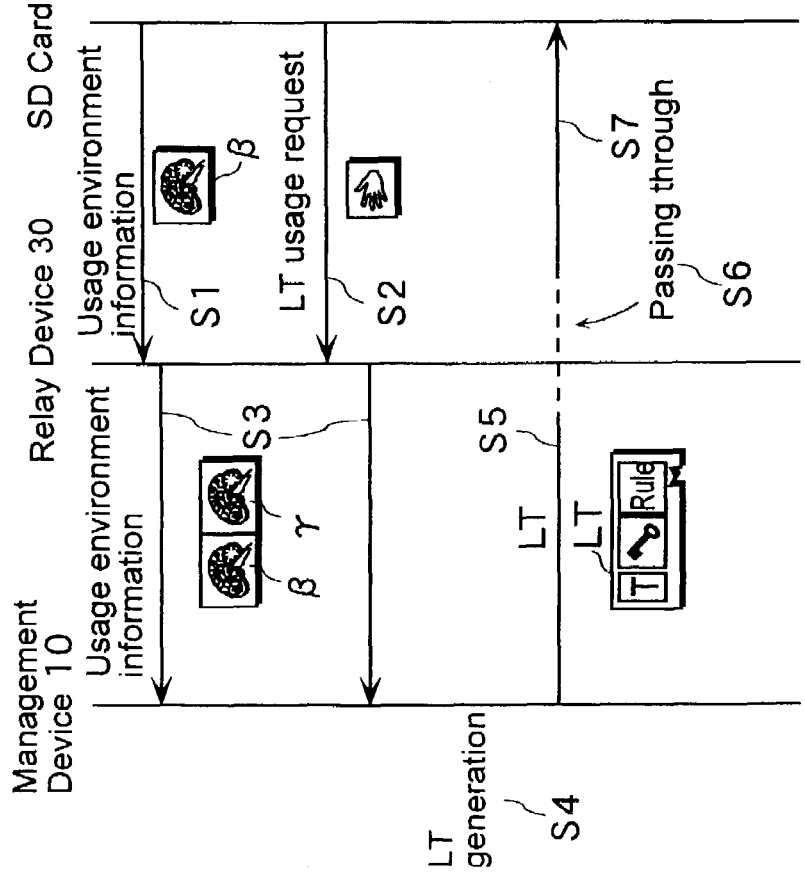

LICENSE MANAGEMENT SYSTEM, LICENSE MANAGEMENT DEVICE, RELAY DEVICE AND TERMINAL DEVICE

BACKGROUND OF THE INVENTION (1) Field of the Invention

The present invention relates to a license management system and others that distribute license information which makes it possible to use a content under a certain usage rule from a management device to a terminal device used by a user who requests a use of the content via a communication network and a relay device.

(2) Description of the Prior Art

In recent years, systems that distribute some digital productions, such as music, videos and games, via the Internet or digital broadcasting have been developed, and a part of them is now in a phase for practical use. For distributing these contents, the methodology of rights, management and usage control (DRM: Digital Rights Management), which restricts the number of times of reproduction (playback), moving and copying for the distributed content, has also been examined from a viewpoint of copyright protection, etc.

The conventional license management systems, as seen in the Japanese Laid-Open Patent Application Nos. 2000-48076 and 2000-293439, have been modeled to distribute license information of the content for each user together with the content itself to a recipient side to have everything managed by a user terminal side.

For example, if a user wants to purchase a right to see a content (a movie, for example) three times, the user terminal receives the content together with its license information indicating "the movie can be viewed three times" via communication from a distribution server, and the playback of the content is under the management according to the usage rule included in the license information. Once the above-mentioned license information is sent to the user terminal, the distribution server is no longer involved with the license information of the user.

The user terminal manages all the license information of the user under these systems, so that the functions of the user terminal expand which, in turn, causes complicated rights processing. As a result, there is a problem that an expensive CPU and others need to be used, and thereby the user terminal becomes expensive accordingly. There is another problem that when the hard disk of the user terminal which stores license information crashes, all the purchased license information is lost.

In order to solve these problems, a system for protecting the copyright of a content has been proposed in which a management device plays a central role in dynamically managing a usage right (license) per content which is given to a user who purchases the content and distributing license information including usage rules for the use of the content in response to a request from a user terminal so as to enable the user to use the content within the scope of the usage rules included in the license information, as disclosed in the Japanese Laid-Open Patent Application No. H10-63364.

According to this system, only simple processing is needed to enable the user to use the content within the scope of the usage rules, and thereby the user terminal can be configured at a low price. Further, as the management device dynamically manages the usage right (license information) per content which is given to the user who purchases the content, the user terminal can acquire the unrequested license information.

In the system having these advantages, terminal devices having a variety of copyright protection functions for the contents have increasingly emerged day by day, in response to the increase of the distributed contents and the request for more sophisticated copyright protection of those contents.

Some terminal devices having a copyright protection function are not directly connected to a network. A storage medium like an SD card, a printer and so on, correspond to the terminal devices of that type. The license information needs to be relayed in order for those terminal devices to acquire the license information. In this case, it is conceivable to connect the storage medium or the printer to a terminal device which is connected to the network and have that terminal device which is connected to the network relay the license information. Note that a terminal device which is connected to a network and relays license information will be referred to as a relay device hereinafter.

The relay device interprets the license information from a viewpoint of copyright protection in the process of relaying the license information from the management device to the storage medium or the printer. As a result, the relay device needs to convert the usage rules included in the license information into the usage rules dependent upon the functions of the storage medium or the printer. Therefore, when the capability of the relay device for processing the license information is lower than that of the storage medium or the printer, there may occur a problem that the license information which is supposed to be used in the terminal device cannot be acquired or the usage rules of the license information are restrained because they are restrained in the relay device. This problem occurs frequently when the version of the relay device is older than that of the terminal device.

Specifically, this problem occurs frequently when the relay device can perform the processing of the minimum unit of usage rule among the usage rules included in the license information, that is, only one playback right, while the terminal device can perform more sophisticated processing of a plural-time playback right than the relay device. In this case, the relay device must, for example, receive distribution of the one-time playback right one by one from the management device, store a plurality of one-time playback rights in itself, and distribute these one-time playback rights one by one to the terminal device after the storage is completed. This kind of processing causes inefficient communication.

On the other hand, when the management device sends the plural-time playback right to the relay device, it is conceived that the relay device subsections the plural-time playback right into the minimum unit of the one-time playback rights, and distributes them one by one to the terminal device. However, this kind of processing also causes inefficient communication, and the terminal device cannot acquire the plural-time playback right at once.

In addition, the relay device may interpret the plural-time playback right as the one-time (the minimum-unit) playback right and nullify the remaining times of the playback right. This kind of processing results in the loss of the purchased license information.

Further, if the terminal device with more sophisticated processing capability than the relay device is developed in the copyright information processing which will be further advanced and expanded in the future, the relay device will not be able to respond to such sophisticated processing.

The object of the present invention is to provide a license management system, a license management device, a relay device and a terminal device that can prevent the license information which is issued from the management device to the terminal device via the relay device from being affected by the relay device, even if there is a functional difference in processing capability of the license information between the relay device and the terminal device.

SUMMARY OF THE INVENTION

Accordingly, in order to achieve the above object, the license management system according to the present invention is a license management system that distributes license information which makes it possible to use a content under a certain usage rule from a management device to a terminal device used by a user who requests a use of a content via a communication network and a relay device, the license management system comprising the management device, the relay device and the terminal device, wherein the management device includes: a usage request analyzing unit operable to acquire a usage request of a content from the terminal device via the relay device and analyze the acquired usage request; a usage environment information analyzing unit operable to acquire usage environment information indicating a usage rule processing capability of the terminal device from the relay device and analyze the acquired usage environment information; a license information generating unit operable to generate license information including a usage rule corresponding to the analysis results of the usage request and the usage environment information; an instruction information generating unit operable to generate instruction information indicating how to handle the license information in the relay device based on the analysis result of the usage environment information; and a license information sending unit operable to embed the generated instruction information in the license information and send the license information to the relay device, and the relay device includes: a license information receiving unit operable to receive the license information in which the instruction information is embedded; and a transferring unit operable to transfer the received license information to the terminal device according to the instruction information which is embedded in the license information with performing certain processing or without performing any processing to the license information.

Accordingly, as the management device can control how to handle license information in the relay device based on the usage environment information of the terminal device, the license information which is issued by the management device to the terminal device via the relay device is prevented from being affected by the relay device, and therefore, the copyright protection function which is inherent in the terminal device is exerted effectively.

For example, even when a capability of handling license information of the relay device is inferior to that of the terminal device, the license information which is issued by the management device is transferred to the terminal device in the same manner as the case where there is no such relay device between the management device and the terminal device. Accordingly, a sophisticated copyright protection function of the terminal device and various uses of a content are secured without depending upon a processing capability of the relay device. Furthermore, even when a storage medium or a content usage terminal with a higher processing capability than that of the relay device is developed with the advance and extension of the copyright information processing in the future, such a high capability is not impaired.

Also, the relay device may further include: a usage environment information holding unit operable to hold the usage environment information of the terminal device in advance; and a notifying unit operable to notify the management device of the usage environment information of the terminal device which is read out from the usage environment information holding unit.

Accordingly, as the usage environment information of the terminal device is held in the relay device in advance, the terminal device need not transfer the usage environment information of the terminal device itself to the relay device. Therefore, the terminal device is freed from transfer of the usage environment information and its processing load is lessened.

Also, the usage environment information holding unit may further hold usage environment information of the relay device itself in advance, the notifying unit may notify the management device of the usage environment information of the relay device and the terminal device which is read out from the usage environment information holding unit, the usage environment information analyzing unit may analyze the usage environment information of the relay device and the terminal device, the instruction information generating unit may compare the usage environment of the relay device with the usage environment of the terminal device based on the usage environment information and generate first instruction information for having the relay device pass through license information when a usage rule processing capability of the terminal device is higher than the usage rule processing capability of the relay device as a result of the comparison, and the transferring unit may transfer the license information to the terminal device according to the first instruction information which is embedded in the license information without performing any processing.

Accordingly, as the license information which is issued by the management device is transferred to the terminal device as it is, an occurrence of a problem that a usage rule of a content indicated by the license information is restrained by the relay device is prevented.

The usage environment information of the relay device and the terminal device includes versions of these devices, and the instruction information generating unit may compare the version of the relay device with the version of the terminal device and generate the first instruction information when the version of the terminal device is newer than the version of the relay device as a result of the comparison. In addition, the usage environment information of the relay device and the terminal device includes content usage types which are to be handled in these devices and numbers of usage times for these types, and the instruction information generating unit may compare the content usage type and the number of usage times for the type of the relay device with the content usage type and the number of usage times for the type of the terminal device and generate the first instruction information when the relay device does not support the content usage type of the terminal device or when the number of usage times of the terminal device is more than the number of usage times which the relay device supports as a result of the comparison.

Also, the license information generating unit may generate license information that is a bulk of a plurality of usage rules with same contents and different usage manners when the usage environment information of the terminal device is unknown, the instruction information generating unit may generate second instruction information for having the relay device select one usage rule among the bulk of the plurality of usage rules when the usage environment information of the terminal device is unknown, and the transferring unit may select one usage rule among the bulk of the plurality of usage rules according to the second instruction information which is embedded in the license information and transfer the license information in which the selected usage rule is embedded to the terminal device.

Accordingly, even when the management device cannot grasp the usage environment of the terminal device, a high capability of the terminal device is not impaired because the license information indicating a plurality of usage rules in various potential usage manners is distributed to the relay device, and a usage rule suitable for the terminal device is selected among them and then transferred to the terminal device as license information.

Also, the terminal device may include: a usage environment information holding unit operable to hold the usage environment information of the terminal device itself in advance; and a notifying unit operable to notify the relay device of the usage environment information of the terminal device which is read out from the usage environment information holding unit, and the relay device may further include: a usage environment information holding unit operable to hold the usage environment information which is notified by the terminal device; and a notifying unit operable to notify the management device of the usage environment information of the terminal device which is read out from the usage environment information holding unit.

Accordingly, as the usage environment information of the terminal device is provided by the terminal device itself, the usage environment information can be updated according to a function change of the terminal device, etc., and therefore, a content distribution system in which a copyright protection function of the terminal device is exactly reflected can be realized.

The management device may further include an encrypting unit operable to encrypt at least a part of the license information, and the terminal device may further include a decrypting unit operable to decrypt an encrypted part of the license information.

Specifically, the encrypting unit may embed the license information in a content as digital watermark data. The relay device may further include: a decrypting unit operable to decrypt an encrypted part of the received license information; a judging unit operable to judge whether or not the usage rule of the decrypted license information includes free information indicating no usage restraint; an encrypting unit operable to re-encrypt a part of the usage rule when the judging unit judges that free information is included; and a storing unit operable to store license information including the usage rule which is encrypted by the encrypting unit.

Furthermore, the license information may be binary data or data which is described in markup language.

The present invention can be realized not only as a license management system, but also as a single unit of a management device, a relay device or a terminal device in the license management device, as a method including a step that is a unit included in each of these devices, or as a program for causing a computer to function as the unit included in the device. Needless to say, the program can be distributed via a recording medium such as a CD-ROM or a transmission medium such as the Internet.

As described above, the present invention makes it possible to perform copyright protection of a content and at the same time, to use a service such as a playback and printing of the content in content usage terminals with different types, functions and usage manners. In addition, the present invention makes a so-called "one-source, multi-use" possible, that is, the present invention makes it possible to use one content for plural purposes or reuse it. Accordingly, the present invention is extremely significant particularly in recent years when the content distribution has become popular with the expansion of broadband networks.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2A is a diagram showing a capability of each device included in this system.

FIG. 2B is a diagram showing a method which adapts to a relay device with a lower capability.

FIG. 2C is a diagram showing a through-mode method according to the present invention.

FIG. 3A is a diagram showing a capability of each device included in this system.

FIG. 3B is a diagram showing a method which adapts to a relay device with a lower capability.

FIG. 3C is a diagram showing a bulk-mode method according to the present invention.

FIG. 7 is a diagram showing an example of usage environment information of a digital TV 20 which is held in a usage environment information managing unit 230.

FIG. 8 is a diagram showing examples of usage environment information of the relay device 30, the SD card 40 and the printer 50 which are held in a usage environment information managing unit 340.

FIG. 10A is a diagram showing the usage environment information in the case where there is a usage request notice from the SD card 40.

FIG. 10B is a diagram showing the usage environment information in the case where there is a usage request notice from the printer 50.

FIG. 11 is a diagram showing a format structure of an LT in a normal mode.

FIG. 23A is a diagram showing a LT of a through mode which is generated in Step S107 as shown in FIG. 21.

FIG. 23B is a diagram showing a LT of a bulk mode which is generated in Step S107 as shown in FIG. 21.

FIG. 24A is a sequence showing communication among the SD card 40, the relay device 30 and the management device 10 which are included in the license management system 1.

FIG. 24B is a sequence showing communication among the printer 50, the relay device 30 and the management device 10 which are included in the license management system 1.

DESCRIPTION OF THE PREFERRED EMBODIMENT(S)

The following is an explanation of the license management system according to the embodiment of the present invention with reference to figures.

Figure 1:
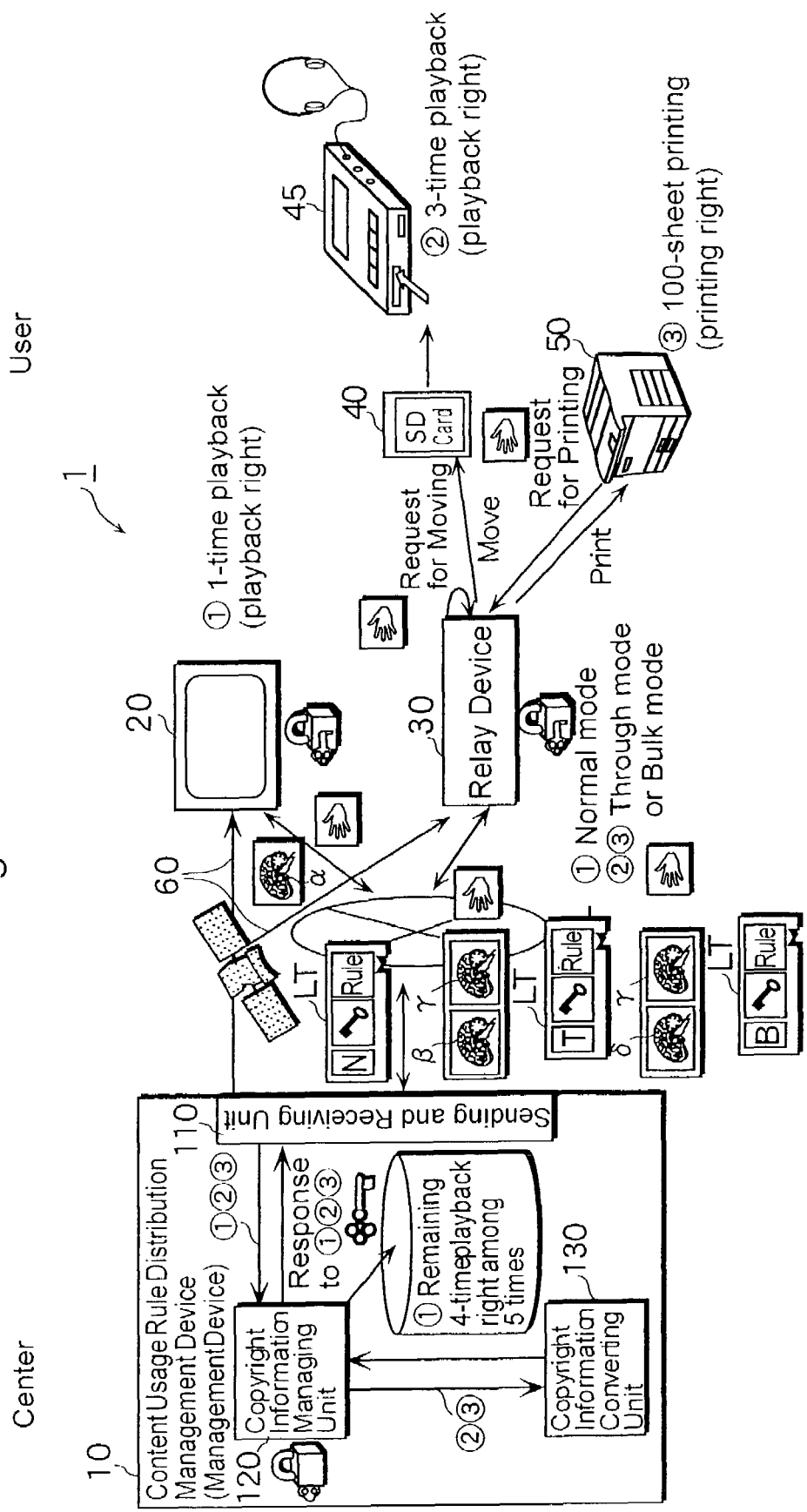
FIG. 1 is a diagram showing an entire configuration of a license management system 1 according to the embodiment of the present invention.

FIG. 1 is a diagram showing an entire configuration of a license management system 1 according to the embodiment of the present invention.

The license management system 1 is a system for protecting a copyright of a content, in which a center plays a central role in dynamically managing a usage right (license) per content which is given to a user who purchases the digital content including an image, a sound or data at least such as music, a still picture, a movie and a book, and distributing license information (hereinafter referred to as a license ticket (or LT)) including a usage rule for the use of the content in response to the user's request so as to enable the user to use the content within the scope of the usage rule included in the LT. The license management system 1 includes a management device 10 which is located in the center and includes a sending and receiving unit 110, a copyright information managing unit 120 and a copyright information converting unit 130, user terminals 20~50 which are used by a user who uses the content, and a network 60 which connects the management device 10 with the user terminal 20 and the user terminal 30 for communicating with each other and transmits a usage request and usage environment information and an LT.

Note that the license information (LT) includes usage restraint information (usage rule) for a user who has a distribution right of a content (such as an author or a copyright holder of the content) to distribute the content, and various types of information required for the use of the content (such as a content key for decoding an encrypted content).

The management device 10 is a computer device such as a work station having a device copyright protection function such as a device managed by a BS/CS digital broadcasting station, an Internet broadcasting station and a copyright information management group, and functions as a license management server, etc. Specifically, the management device 10 manages a user who joins the present system 1 and a terminal which the user owns, accepts a purchase of a content from the user terminal, etc., accepts a content usage request from the user terminal, etc. or usage environment information indicating capability of the user terminal for processing a usage rule, charges the content fee in response to a content purchase request from the user terminal, distributes the encrypted content to the user terminal, and distributes an LT to enable the user to use the encrypted content on the user terminal in response to the usage request. This LT includes a content key, etc. for decrypting the encrypted content, a cutout usage rule of which a part is cut out of the usage right (license) which is given to the user regarding the content, and instruction information for controlling relay processing of the LT (a normal mode: N, a through mode: T, a bulk mode: B).

The user terminals 20, 30, 40, 45 and 50 are computer devices having a copyright protection function, which send a content purchase request to receive a distribution of the content, and send a usage request or usage environment information for the use of the content to receive an LT and play back the content within the scope of a cutout usage rule of the LT, and it functions as clients for the management device 10.

Specifically, the user terminal 20 is a digital TV or the like including a receiver, the user terminal 30 is a receiver, that is, a set-top box or a home personal computer, etc. which can connect the user terminal 40 or the user terminal 50 to its own terminal and relay a usage request or an LT of these terminals, the user terminal 40 is a storage medium like an SD memory card or a D-VHS recording player, the user terminal 45 is an SD player which can connect the user terminal 40 to itself so as to enable a user to use a content within the scope of the usage rule stored in the user terminal 40, and the user terminal 50 is a printer. Note that in order to clearly distinguish each of the user terminals, the user terminal 20, the user terminal 30, the user terminal 40, the user terminal 45 and the user terminal 50 will also be referred to as the digital TV 20, the relay device 30, the SD card 40, the SD player 45 and the printer 50, respectively, hereinafter.

The network 60 is a broadband cable communication medium, such as the Internet or a CATV, or a wireless communication medium such as digital broadcasting.

When a user of the digital TV 20 wants to play back a predetermined content five times in total on the digital TV 20, the user purchases a right to play back the content five times from the management device 10 using operation keys of the digital TV 20 (not shown). The management device 10 manages a playback right for five-time playback of the content purchased by the user in a copyright-related information DB 124 of the copyright information managing unit 120. When the user wants to play back the content once on the digital TV 20, he/she inputs a one-time playback using the operation keys (not shown) of the digital TV 20. Then the digital TV 20 sends a usage request for one-time playback (See ① in FIG. 1) and usage environment information α of the digital TV 20 to the management device 10 via the network 60.

When the sending and receiving unit 110 of the management device 10 receives the usage request for one-time playback and the usage environment information α, the copyright information managing unit 120 of the management device 10 decides whether the usage environment information which is received via the sending and receiving unit 110 is only for the digital TV 20 or not. When it is only for the digital TV 20 as a result of the decision, the copyright information managing unit 120 determines that instruction information (hereinafter also referred to as "a control mode") which is to be embedded in an LT which is to be sent in response to the usage request from the digital TV 20 is a normal mode. The copyright information managing unit 120, based on the usage request, cuts out the playback right for one-time playback among the purchased five-time right, generates the LT in which the instruction information of the normal mode ("N" in FIG. 1) is embedded, and sends the generated LT to the digital TV 20 via the sending and receiving unit 110 and the network 60. Here, the copyright information managing unit 120 does not distribute the playback right of all the five times, but manages the remaining playback right for four times after the one-time right is cut out. Same processing is performed for the second and the following usage requests. The digital TV 20 interprets the usage rule, etc. included in the received LT so as to enable the user to use (or play back) the content based on the usage rule, etc.

When a user of the SD player 45 (SD card 40) wants to play back his/her purchased content three times, he/she connects the SD card 40 to the relay device 30, and inputs a three-time playback using the operation keys (not shown) of the relay device 30. Then, the relay device 30 sends a usage request for three-time playback (See ② in FIG. 1), usage environment information β of the SD card 40 and usage environment γ of the relay device 30 to the management device 10 via the network 60.

When the sending and receiving unit 110 of the management device 10 receives the usage request for three-time playback and the usage environment information β, γ, the copyright information managing unit 120 of the management device 10 compares the usage environment information β of the SD card 40 with the usage environment information γ of the relay device 30. When the SD card 40 is more intelligent, that is, the SD card 40 has higher processing capability of an LT than the relay device 30, the copyright information managing unit 120 determines that instruction information which is to be embedded in an LT which is to be sent in response to the usage request of the SD card 40 is a through mode. Then, the copyright information managing unit 120 converts the right information (usage rule) into one format in which the SD card 40 is available in the copyright information converting unit 130 in the management device 10 in order to distribute the three-time playback right all at once to the SD memory card, generates the LT in which the instruction information of the through mode ("T" in FIG. 1) is embedded, and sends the generated LT to the relay device 30 via the sending and receiving unit 110 and the network 60. The relay device 30 analyzes the instruction information of the LT on receiving the LT. When the LT is found to be the through mode, the relay device 30 passes through the LT to the SD card 40 as it is without interpreting the usage rule, etc. As a result, the SD player 45 can use (play back) the content three times based on the usage rule included in the LT received by the SD card 40.

When a user of the printer 50 wants to print 100sheets of the purchased content, he/she inputs a 100-sheet printing using the operation keys (not shown) of the printer 50. The relay device 30 sends a usage request for 100-sheet printing (See ③ in FIG. 1), usage environment information δ of the printer 50 and usage environment information γ of the relay device 30 to the management device 10 via the network 60.

When the sending and receiving unit 110 of the management device 10 receives the usage request for 100-sheet printing and the usage environment information δ, γ, the copyright information managing unit 120 of the management device 10 decides whether the usage environment δ of the printer 50 is unknown or not. When the environment information δ of the printer 50 is unknown, the copyright information managing unit 120 determines that the instruction information which is to be embedded in an LT which is to be sent in response to the usage request of the printer 50 is a bulk mode. The copyright information managing unit 120 converts the right information (usage rule) into a plurality of formats in which the SD card 40 is available in the copyright information converting unit 130 in the management device 10 in order to distribute a bulk of plural usage rules which are same as the 100-sheet printing in a content but different from it in a usage manner to the printer 50 all at once, generates the LT in which the instruction information in the bulk mode ("B" in FIG. 1) is embedded, and sends the generated LT to the relay device 30 via the sending and receiving unit 110 and the network 60. Note that the bulk includes "one 100-sheet printing", "100 one-sheet printings," etc.

When the relay device 30 receives the LT, it analyzes the instruction information of the LT. When it is found to be the LT of the bulk mode, the relay device 30 selects one usage rule which is interpretable to the relay device 30 among the bulk of the usage rules ("100 one-sheet printings", for example), and sends the LT including the selected usage rule to the printer 50. As a result, the printer 50 can print 100 sheets of the content based on the usage rule, etc. included in the received LT. Note that when the usage environment information of the SD card 40 is unknown, in the same manner as the case of the printer 50, the management device 10 generates an LT of the bulk mode, and the relay device 30 selects one usage rule among the bulk of the rules, and sends the LT including the selected usage rule to the SD card 40. Also, when the usage environment information of the printer 50 is known and the printer 50 is more intelligent, the same processing as the above processing for the SD card 40 is performed.

Here, when the printer makes a usage request for 100-sheet printing, there are two methods, a method for adapting to the relay device having functionally lower capability and a method of the present invention. These two methods will be explained below by comparing them. FIG. 2A is a diagram showing a capability of each device included in this system, FIG. 2B is a diagram showing a method which adapts to a relay device with a lower capability, and FIG. 2C is a diagram showing a through-mode method according to the present invention.

When the printer makes a usage request for 100-sheet printing, the management device which can divide out plural times of the usage right (printing right for N times, etc.) generates an LT including a usage rule for 100-sheet printing as usual. The terminal device with a lower capability which performs processing of the usage rule of the LT at the minimum unit (printing right for one time, etc.) interprets the usage rule of the LT, divides the 100-sheet printing into 100 one-sheet printings, for example, in conformity with its own capability of printing one sheet, and sends 100 LTs including usage rules for one-sheet printing sequentially to the printer (FIG. 2B). In this case, problems occur such as processing load on the relay device and the printer and communication delay.

On the contrary, according to the method of the present invention, the management device generates the LT including the usage rule for 100-sheet printing, embeds the instruction information of the through mode in the generated LT, and then transfers the LT. The terminal device with a lower capability which performs processing of the usage rule of the LT at the minimum unit (printing right for one time, etc.) sees the instruction information of the LT (the through mode), and passes through the LT as it is without interpreting the usage rule for 100-sheet printing at all (FIG. 2C).

Therefore, the problems such as processing load on the relay device and the printer and communication delay can be solved even if the relay device has a lower capability than the content usage terminal.

Next, when a usage request for three-time copying to the SD card is made, there are two methods, a method for adapting to the relay device having functionally lower capability and a method of the present invention. These two methods will be explained below by comparing them. FIG. 3A is a diagram showing a capability of each device included in this system, FIG. 3B is a diagram showing a method which adapts to a relay device with a lower capability, and FIG. 3C is a diagram showing a bulk-mode method according to the present invention.

When the usage request for three-time copying to the SD card is made, the management device which can divide out plural times of the usage right (copying right for N times, etc.) generates an LT including a usage rule for three-time copying as usual. The terminal device which performs processing of the usage rule of the LT at the minimum unit (copying right for one time and one generation) interprets the usage rule of the LT, changes the usage rule of copying right for three times into the usage rule of the copying right for one time and one generation, for example, in conformity with its own capability of copying one time and one generation, and sends one LT including the changed usage rule of copying right for one time and one generation to the SD card (FIG. 3A). In this case, a problem occurs that only one copying can be made although the usage rule for copying three times is supposed to be acquired.

On the contrary, according to the method of the present invention, when the usage environment information of the SD card is unknown, the management device generates an LT including a bulk of plural usage rules which is same as the usage rule of copying three times in a content but different in a usage manner ("one three-time copying", "3 one-time copyings," etc.) and an instruction information (bulk mode), and sends it to the relay device. The terminal device with a lower processing capability which performs processing of the usage rule of the LT at the minimum unit (copying right for one time, etc.) sees the instruction information of the LT (bulk mode), selects one usage rule among the bulk of plural usage rules, and transfers the LT including the selected usage rule ("3 one-time copyings," for example) to the SD card (FIG. 3C).

Therefore, even if the relay device has a lower capability than the content usage terminal, the management device generates the LT including a bulk of plural usage rules with the same contents but in different formats and the instruction information (bulk mode) when the copyright management method of the terminal device is unknown. As a result, the usage rule for three-time copying can be used practically even if the relay device 30 selects any rule among the bulk of the usage rules. That is, the copyright management function of the terminal device can be maximized, and therefore, the problem that copying can be made only once can be solved.

Next, a functional structure of each device included in the license management system 1.

Figure 4:
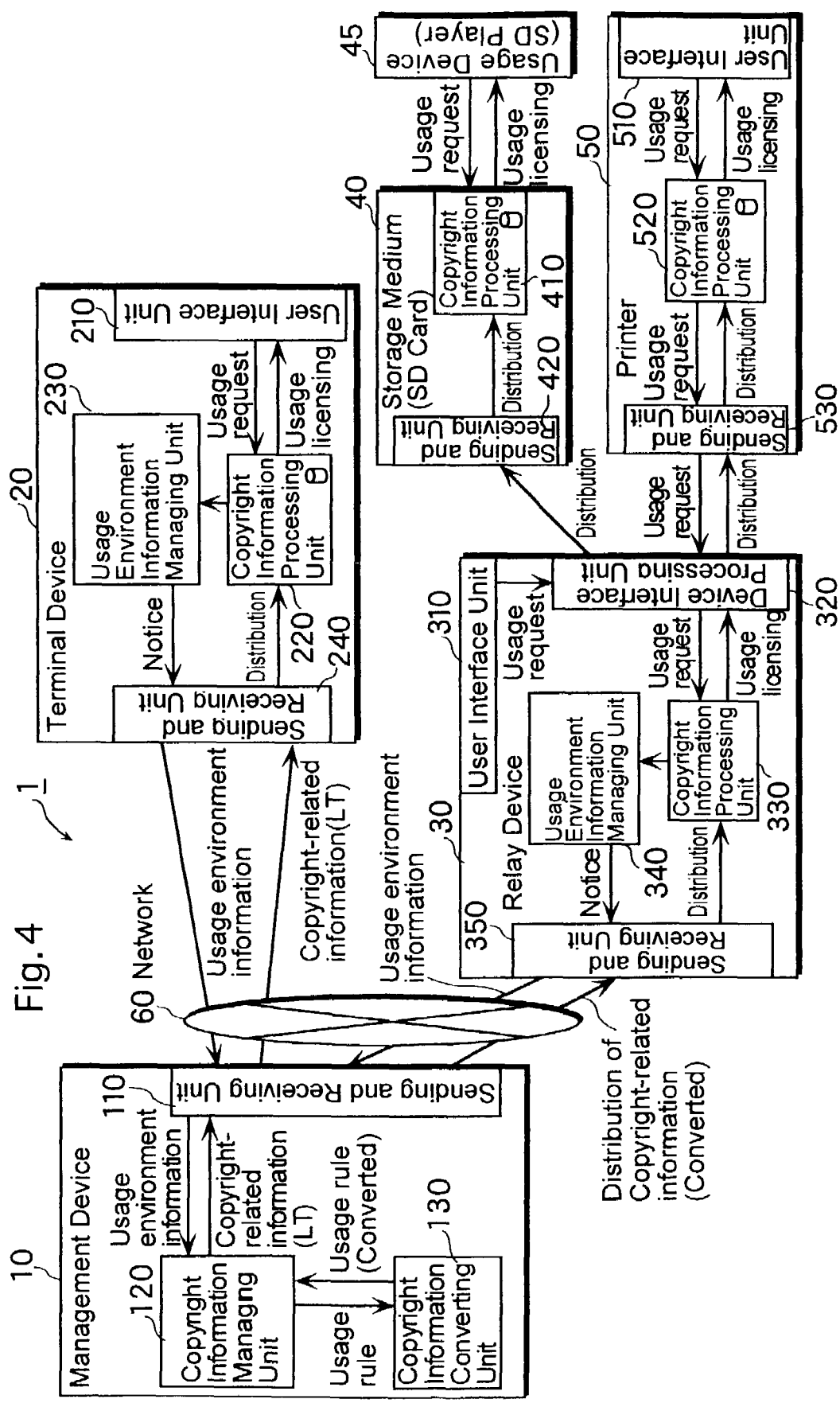
FIG. 4 is a block diagram showing a specific functional structure of each device as shown in FIG. 1.
Figure 5:
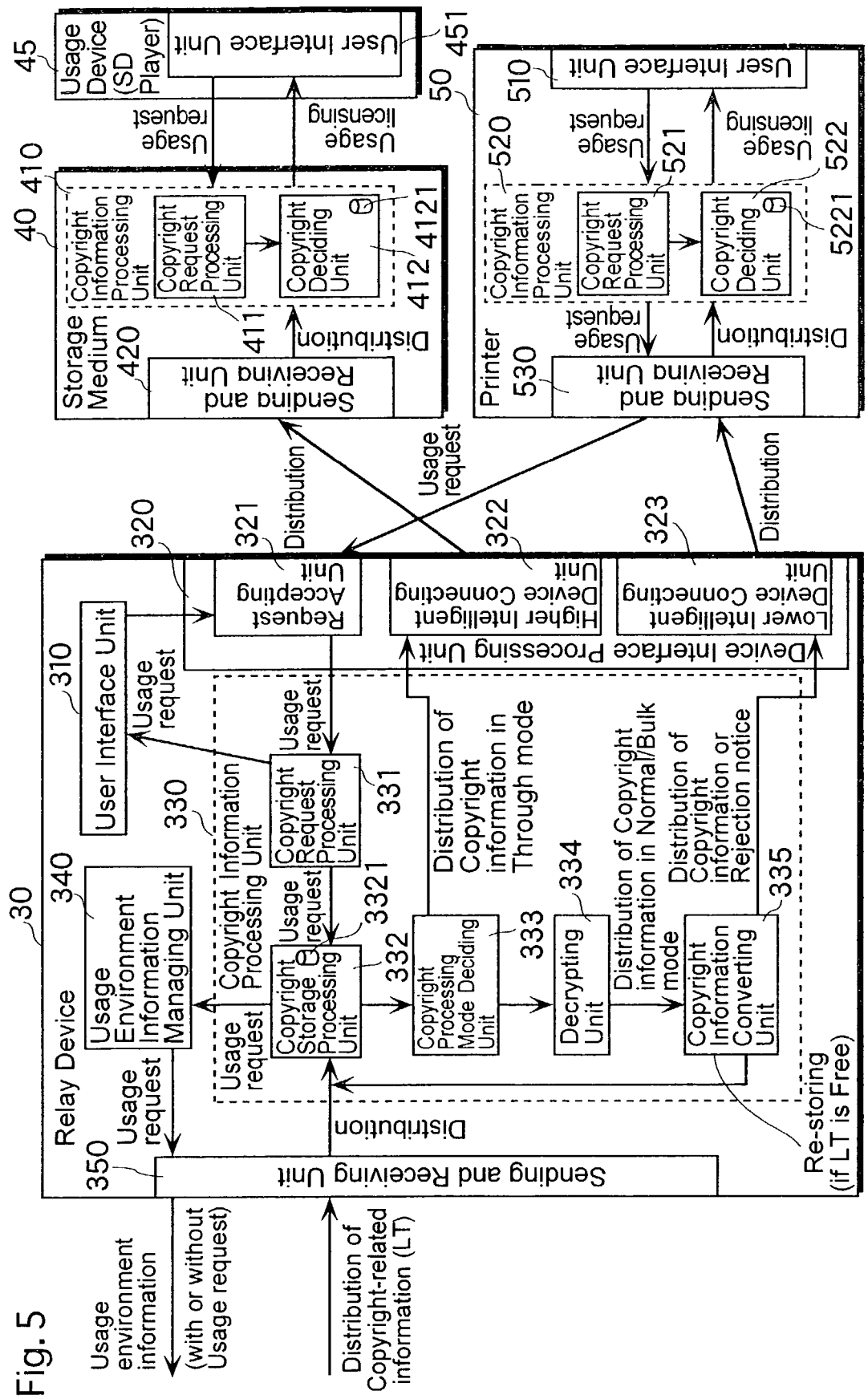
FIG. 5 is a block diagram showing a detailed functional structure of an SD card 40, a printer 50 and a relay device 30 as shown in FIG. 1.
Figure 6:
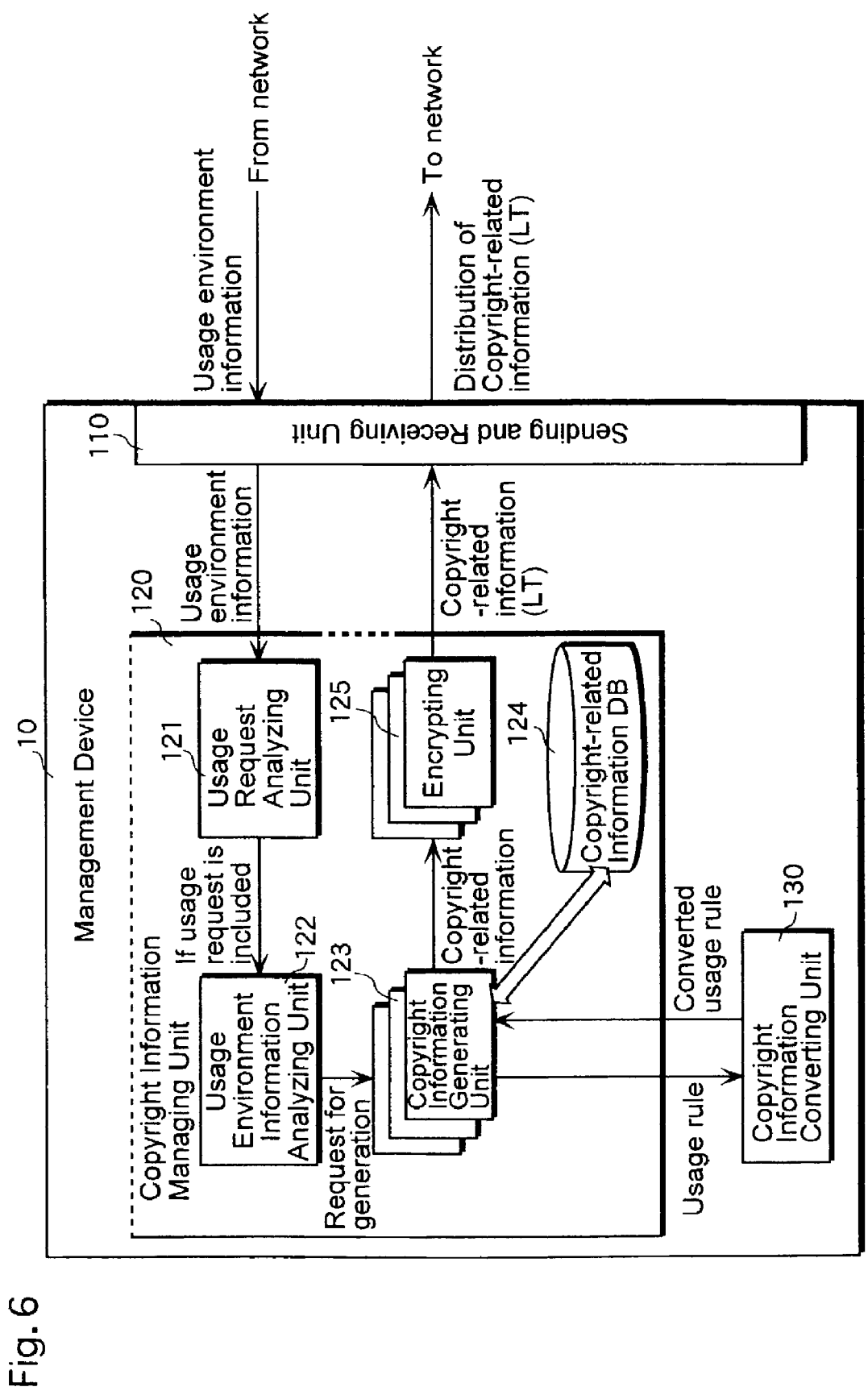
FIG. 6 is a block diagram showing a detailed functional structure of a management device 10 as shown in FIG. 1.

FIG. 4 is a block diagram showing a specific functional structure of each device as shown in FIG. 1, FIG. 5 is a block diagram showing a detailed functional structure of the SD card 40, the printer 50 and the relay device 30 as shown in FIG. 1, and FIG. 6 is a block diagram showing a detailed functional structure of the management device 10 as shown in FIG. 1.

The license management system 1 includes the management device 10, the digital TV 20, the relay device 30, the SD card 40, the SD player 45, the printer 50, etc. The relay device 30 is a device which can relay a message of requesting a content use from the SD card 40 and the printer 50 and an LT corresponding to this usage request by connecting the SD card 40 and the printer 50 to itself, and distributes the usage request, usage environment information and LT via the network 60 by way of broadcasting and communication.

Note that although the content can correspond to the usage request and the LT regarding the content by a unique identifier for specifying the content, a so-called content ID, the content and the usage request or the LT can be managed independently. Also, when the LT is sent via the network 60 of broadcasting, the management device 10 sends the LT in advance without the usage request. Also, in the license management system 1, the management device 10 may manage the content, or a content management device which is located in a place neighboring to or remote from the management device 10 may manage the content, and thereby accept the purchase of the content and distribute the content. Furthermore, a terminal device which is located in a station kiosk, etc. may accept the purchase of the content and distribute the recording medium on which the content is recorded, or the recording medium on which the content is recorded may be distributed as a supplement to a magazine and the content management device may accept the purchase of the desired content. Note that since the distribution of the content itself is not the central feature of the present invention, explanation of the distributor and the distribution method of the content will be omitted.

The digital TV 20 includes a user interface unit 210, a usage environment information managing unit 230, a sending and receiving unit 240 and a copyright information processing unit 220.

The user interface unit 210 is a GUI (graphical user interface) which accepts a user's operation and display various types of information for use of a content such as an image, a sound and data.

The copyright information processing unit 220 is a processing unit which performs usage control processing based on the usage rule of the LT such as accepting a usage request for the use of the content and holding an LT (or copyright-related information).

The usage environment information managing unit 230 is a processing unit for managing the usage environment information of its own terminal (the digital TV 20). When the usage environment information managing unit 230 receives a usage request from a copyright information processing unit 520, it transfers the usage environment information to the sending and receiving unit 240 along with the usage request or separately. The usage environment information of the digital TV 20 specifically includes, as shown in FIG. 7, a content user ID "0×1" that is a unique identifier which is given to a content user in the digital TV 20, a terminal ID "0×20" that is a unique identifier which is given to the digital TV 20, a copyright protection function type of the digital TV 20 (a version of the digital TV 20, a content usage type such as playback and moving, and a number of times of that type such as one time), and a reservation that is an area reserved for storing a usage history, etc.

The sending and receiving unit 240 is a communication interface which sends a message such as usage environment information and a usage request to the management device 10, or receives an LT sent from the management device 10.

Note that the digital TV 20 actually requires various components for realizing an authentication function for an equipment authentication and a personal authentication, a tamper-resistant function for secure processing of each function, and a power management function, in addition to the above, but these components are not main features of the present invention and therefore the figures and explanation of them will be omitted.

The SD card 40 includes a copyright information processing unit 410 and a sending and receiving unit 420.

The copyright information processing unit 410, which is a unit for performing usage control processing based on an LT, includes a copyright request processing unit 411 and a copyright deciding unit 412.

The copyright information processing unit 410 accepts a usage request from the user interface unit 451 of the SD player 45, and sends the usage request to the copyright deciding unit 412.

The copyright deciding unit 412 includes a storing unit 4121 for temporarily storing an LT which is received via the sending and receiving unit 420. When the copyright deciding unit 412 receives a usage request from the copyright request processing unit 411, it decides whether or not there is an LT corresponding to the request in the storing unit 4121, and has the user interface unit 451 display the decision result. And when the copyright deciding unit 412 receives an LT from the sending and receiving unit 420, it stores the LT in the storing unit 4121, notifies the user interface unit 451 that the content can be used and has the user interface unit 451 display that effect.

The sending and receiving unit 420 is an interface for receiving an LT which is distributed from the relay device 30.

Note that the SD card 40 actually requires various components including a tamper-resistant function for secure processing of each function and an interface function between the SD player 45, in addition to the above, but these components are not the main features of the present invention and therefore the figures and explanation of them will be omitted.

The SD player 45 includes the user interface unit 451.

The user interface unit 451 is a GUI which accepts user's operations or displays a message when the user uses a content such as an image, a sound and data.

Note that the SD player 45 actually requires various components including a playback function for use of a content and an interface function between the SD card 40, in addition to the above, but these components are not the main features of the present invention and therefore the figures and explanation of them will be omitted.

The printer 50 includes a user interface unit 510, a copyright information processing unit 520 and a sending and receiving unit 530.

The user interface unit 510 is a GUI which accepts user's operations and displays a message when the user uses a content such as an image, a sound and data.

The copyright information processing unit 520, which is a unit for performing usage control processing based on an LT, includes a copyright request processing unit 521 and a copyright deciding unit 522.

The copyright request processing unit 521 specifies a unique content ID which establishes a correspondence between a content which is subject to a usage request and an LT of the content, inquires of the copyright request processing unit 521 whether an LT corresponding to the usage request is stored or not in the storing unit 5211 of the copyright request processing unit 521, and sends the usage request to the sending and receiving unit 530 when the corresponding LT is not stored in the storing unit 5211 as a result of the inquiry.

The copyright deciding unit 522 having the storing unit 5211 for temporarily storing an LT which is distributed from the sending and receiving unit 530, analyzes the LT, and notifies a user of a content via the user interface unit 510 based on the LT that the usage of the content is licensed.

The sending and receiving unit 530 is a communication interface which sends a usage request to the relay device 30 and receives an LT which is distributed from the relay device 30.

Note that the printer 50 actually requires various components for realizing an authentication function for an equipment authentication and a personal authentication, a tamper-resistant function for secure processing of each function, and a power management function, in addition to the above, but these components are not the main features of the present invention and therefore the figures and explanation of them will be omitted.

The relay device 30 includes a user interface unit 310, a device interface processing unit 320, a copyright information processing unit 330, a usage environment information managing unit 340, a sending and receiving unit 350 and others.

The user interface unit 310 is a GUI which accepts user's operations for a usage request of a content.

The device interface processing unit 320, which is an interface which connects the SD card 40 or the printer 50, receives a usage request from the printer 50 and sends the LT to the SD card 40 or the printer 50, includes a request accepting unit 321, a higher intelligent device connecting unit 322 for connecting a higher intelligent terminal device than the relay device 30, and a lower intelligent device connecting unit 323 for connecting an equal or lower intelligent terminal device than the relay device 30.

The request accepting unit 321 accepts a usage request from the terminal device (printer 50) or the user interface unit 310.

The higher intelligent device connecting unit 322 distributes a through-mode LT to the terminal device (such as the SD card 40).

The lower intelligent device connecting unit 323 distributes a normal-mode LT or a bulk-mode LT to the terminal device (such as the printer 50).

The copyright information processing unit 330, which is a unit for accepting a usage request via the device interface processing unit 320 or distributing an LT which is distributed from the management device 10 to the destination device via the device interface processing unit 320 after performing the processing of the LT based on its control mode, includes a copyright request processing unit 331, a copyright storage processing unit 332, a copyright processing mode deciding unit 333, a decrypting unit 334, a copyright information converting unit 335 and others.

The copyright request processing unit 331 analyzes the contents of the usage request which is accepted by the request accepting unit 321. And when the usage request can be normally analyzed as a result of the analysis, the copyright request processing unit 331 transfers the analyzed usage request to the copyright storage processing unit 332 in order to confirm whether or not it has already received the LT corresponding to the usage request from the management device 10. When the usage request is abnormal, the copyright request processing unit 331 nullifies the usage request and notifies the requesting device that it rejects the usage request.

The copyright storage processing unit 332 having a storing unit 3321 for storing unpurchased LTs (contents have not yet been distributed but only LTs have been distributed in advance) or purchased LTs (both contents and LTs have been already distributed, and the contents can be used freely) among the LTs which are distributed from the sending and receiving unit 350, sends the usage request to the usage environment information managing unit 340 when there is no LT corresponding to the usage request which is transferred from the copyright request processing unit 331 in the storing unit 3321. Also, when the LTs corresponding to the usage request are stored in the storing unit 3321, the copyright storage processing unit 332 transfers the LT which is distributed from the sending and receiving unit 350 to the copyright processing mode deciding unit 333.

Note that an unpurchased LT is stored in the storing unit 3321 because it is considered that broadcasting of one-way communication is used as a network and an LT is sometimes received at an earlier timing than a content itself in the broadcasting. This is the processing in the case where only the LT corresponding to the purchased content is received, because the LT is usually distributed after the content is purchased when a two-way communication is used as a network. Therefore, in the usual case, the LT is not stored in the storing unit 3321, and it is stored there after the LT including a free usage rule is decrypted and re-encrypted.

The copyright processing mode deciding unit 333 refers to a control mode that is a parameter in the LT, and sends the LT to the higher intelligent device connecting unit 322 as it is when it is a through mode even if the right information in a black box area 823 (FIG. 16) is encrypted. When the control mode that is a parameter in the LT is a normal mode or a bulk mode, the copyright processing mode deciding unit 333 sends the LT to the decrypting unit 334.

The decrypting unit 334 decrypts the encrypted normal-mode or bulk-mode LT, and sends the decrypted LT to the copyright information converting unit 335.

When the control mode is the normal mode, the copyright information converting unit 335 distributes the normal-mode LT to the SD card 40 or the printer 50 via the lower intelligent device connecting unit 323. When the control mode is the bulk mode, the copyright information converting unit 335 selects one of the usage rules (right information) of a format analyzable in the printer 50 among a plurality of the usage rules (a bulk area 824 in FIG. 17), and distributes the LT including only one selected usage rule to the printer 50 via the lower intelligent device connecting unit 323. Note that when the decrypted LT includes a rule of free usage, the copyright information converting unit 335 re-encrypts only the rule of free usage and then has the storing unit 3321 store the rule in order to reuse the right in the copyright storage processing unit 332. In other cases, the LTs are nullified from the relay device 30.

The usage environment information managing unit 340 is a processing unit for managing usage environment information of the relay device 30 and the terminal devices (such as the SD card 40 and the printer 50) which are connected to the relay device 30. When the usage environment information managing unit 340 receives a usage request from the copyright storage processing unit 332, it transfers the usage environment information, along with the usage request or separately, to the sending and receiving unit 350.

The usage environment information of the relay device 30 itself which is managed in the usage environment information managing unit 340 specifically includes the following as shown in FIG. 8: a content user ID ("0×2" when the relay device 30 uses the content, "-"(null) when it relays the content) that is a unique identifier which is given to the content user, a terminal ID ("0×30") that is a unique identifier which is given to the relay device 30, a copyright protection function type (a version of the relay device 30, a content usage type such as playback and moving, and a number of times of that type such as one time), and a reservation that is an area reserved for storing a usage history, etc. The usage environment information of the SD card 40 includes the content user ID ("0×3"), the terminal ID ("0×40"), the copyright protection type (the version, the usage type such as playback and moving, and the number of times (plural number of times is possible)), and the reservation. Also, the usage environment information of the printer 50 includes the content user ID ("0×4"), the terminal ID ("0×50"), the copyright protection type (the version, the usage type such as printing, and the number of times (plural number of times is possible)), and the reservation. Note that when the copyright protection function type of the SD card 40 or the printer 50 is not acquired nor understood, it is to be unknown. Also, the copyright information type of the SD card 40 or the printer 50 is acquired in advance and held in response to the inquiry from the relay device 30 during connection to these units. Furthermore, when the SD card 40 or the printer 50 includes the usage environment information managing unit which manages its own usage environment information and the sending unit which sends the usage environment information, the usage environment information managing unit 340 may hold the usage environment information which is sent from the SD card 40 or the printer 50.

The sending and receiving unit 350 is a communication interface for notifying the management device 10 via the network 60 of usage environment information, a usage request and a message including a mixture of these information and request, and receiving a content usage rule (LT) which is distributed from the management device 10 via the network 60.

Note that the relay device 30 actually requires various components for realizing an authentication function for an equipment authentication and a personal authentication, a tamper-resistant function for secure processing of each function and a power management function, in addition to the above, but these components are not the main features of the present invention and therefore the figures and explanation of them will be omitted.

The management device 10 includes the sending and receiving unit 110, the copyright information managing unit 120, the copyright information converting unit 130. The copyright information managing unit 120 includes the usage request analyzing unit 121, the usage environment information analyzing unit 122, the copyright information generating unit 123, the copyright-related information DB 124, the encrypting unit 125, etc. Note that explanation of the copyright information converting unit 130 will be omitted because it has been described above.

The sending and receiving unit 110 is a communication interface which receives a message of a usage request or usage environment information from the digital TV 20 and the relay device 30 which connects to the SD card 40 or the printer 50, and distributes unconverted or converted copyright-related information (LT) corresponding to the usage request to the digital TV 20 or the relay device 30 based on the usage environment information.

The copyright information managing unit 120, which is a unit for managing a usage rule of a content such as an image, a sound and data and copyright-related information such as an encryption/decryption key, includes the copyright-related information DB 124, the usage request analyzing unit 121, the usage environment information analyzing unit 122, the copyright information generating unit 123, the encrypting unit 125, etc.

The copyright-related information DB 124 manages a terminal ID, a user ID, a content ID, a content key, a preview key, a usage rule of each user managed by the management device 10, etc. by defining correspondences between them.

The usage request analyzing unit 121 analyzes whether the message (telegraphic message) which is received from the digital TV 20 or the relay device 30 is usage environment information, a usage request or something including both.

Figure 9:
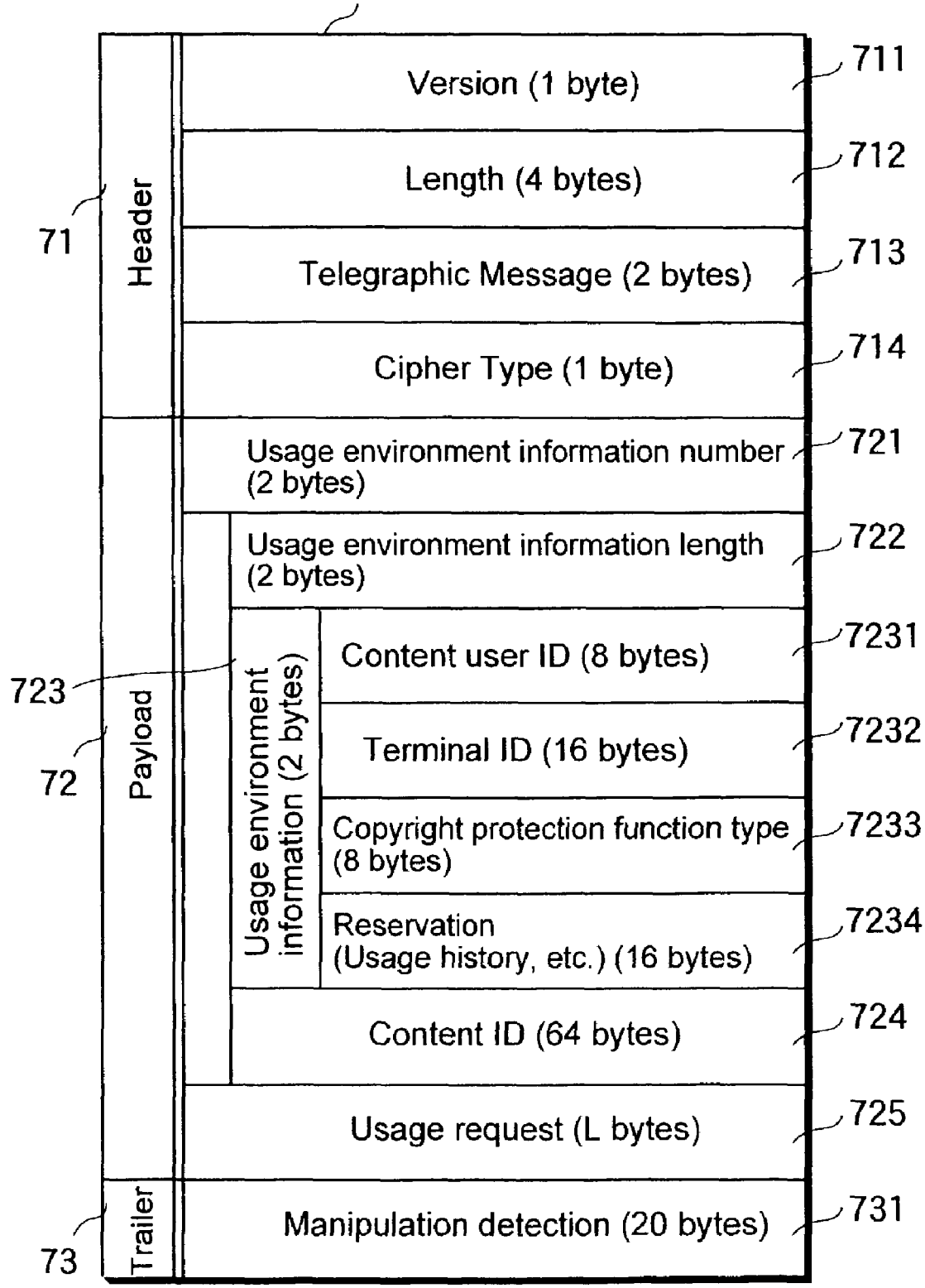
FIG. 9 is a diagram showing a format structure of a message of the usage environment information.

FIG. 9 is a diagram showing a format structure of the above message (such as the usage environment information and usage request).

The message 70 (usage environment information notice) is something for notifying the usage request and the usage environment information such as the type of the terminal device indicated by the terminal ID such as the digital TV 20, the relay device 30, the SD card 40 and the printer 50, and the copyright-related information processing function indicated by the copyright protection function type (a version, a usage type, a number of times for each type (once or plural times)), and includes a header 71 which is not subject to encryption, a payload 72 which is subject to encryption and a trailer 73.

The header 71 includes a version 711, a length 712, a telegraphic message 713, a cipher type 714, etc. and their respective parameters.

The parameters of the version 711 are adaptable to the future extension and improvement of the usage request and usage environment information notice, and the newer the parameter is, the larger number it is indicated by. For example, the parameters are indicated by the numbers "0"~"255".

The parameter of the length 712 indicates the entire length of the area to be encrypted of the variable length (the payload 72 and the trailer 73), and is provided for identifying a size for encryption/decryption.

The parameter of the telegraphic message ID 713 indicates whether only the information of the usage environment notice is stored in the usage environment information 70 or both of the usage environment notice and the usage request are stored there. When only the information of the usage environment notice is stored, the numerical value "0x0010" is stored, and when both information is stored there, the numerical value "0x0030" is stored.

The parameter of the cipher type 714 indicates whether the area to be encrypted (the payload 72 and the trailer 73) is encrypted or not, and the encryption type when it is encrypted. When it is not encrypted, the numerical value "0" is stored, and when it is encrypted, the numerical value corresponding to the encryption type "1"~"255" is stored.

The payload 72 includes a usage environment information number 721, a usage environment information length 722, a usage environment information 723, a content ID 724, a usage request 725, etc. and their respective parameters.

The parameter of the usage environment information number 721 is a numerical value of "0"~"65535" indicated by a mixture of the numbers of the usage environment information length 722 and the usage environment information 723. When "0x0030" indicating that both the usage environment information and the usage request are stored is stored in the telegraphic message ID 713, and "0" is stored in the usage environment information number 721, it is indicated that the message is only the usage request. Therefore, this telegraphic message can transmit the message in three patterns; the usage environment information only, the usage request only, and both the usage environment information and the usage request.

The usage environment information length 722 is the length of the usage environment information 723 indicated by byte.

The parameter of the usage environment information 723 includes the parameters of the above-mentioned content user ID 7231, terminal ID 7232, copyright protection function type 7233, reservation 7234, etc.

As for the usage environment information in the case where a usage request in the SD card 40 is notified, the usage environment information of the SD card 40 is stored first and then that of the relay device 30 is stored, as shown in FIG. 10A. Also, as for the usage environment information in the case where the printer 50 notifies of a usage request, the usage environment information of the printer 50 is stored first and then that of the relay device 30 is stored, as shown in FIG. 10B. Thereby, when there are plural relay devices, it can be understood definitely in what order the relay devices are connected from the terminal device as a request source.

The parameter of the usage environment information length 722 is the length of the usage environment information 723 indicated by byte.

The content ID 724 indicates a unique identifier for specifying a content which is subject to a usage request.

The usage request 725 is a linkage of required pieces of 2 bytes including a higher one byte of a descriptor number indicating a usage type (action type) such as Playback, Move, Copy, Print and Modify and a lower one byte of a license of a right per action (no usage: Never=0, usage for once: Once=1, all-you-can-use: Free=2).

The trailer 73 includes a parameter of a manipulation detection 731 which stores a hash value which is obtained by encryption by a SHA-1 or the like for the header 71 and the payload 72.

The usage environment information analyzing unit 122 analyzes the usage environment information of the digital TV 20, the terminal device (the SD card 40 or the printer 50) and the relay device 30, compares the usage environment information of each device, or determines instruction information (control mode) which is to be embedded into an LT. More specifically, when the copyright information processing capability of the SD card 40 or the printer 50 is more intelligent than that of the relay device 30, that is, when the terminal device connected to the relay device 30 can perform higher functional processing, for example, when the version of the SD card 40 or the printer 50 is newer (the version number is larger) than that of the relay device 30, or the number of usage times supported by the SD card 40 or the printer 50 is larger than that supported by the relay device 30, the usage environment information analyzing unit 122 specifies the control mode as a through mode. When the usage environment is unknown, that is, more specifically, the management device 10 cannot acquire usage environment information (a version, a usage type and a number of times for each type) of the terminal device connected to the relay device 30, the usage environment information analyzing unit 122 determines the control mode as a bulk mode. In other cases, that is, when the relay device 30 and its terminal device are equivalent or the relay device 30 is more intelligent, the usage environment information analyzing unit 122 considers it a normal operation and specifies the control mode as a normal mode.

The usage environment information analyzing unit 122 instructs the copyright information generating unit 123 to perform the determined control mode, and request it to generate an LT according to the instruction.

In response to the instruction of the usage environment information analyzing unit 122, the copyright information generating unit 123 collaborates with the copyright information converting unit 130 to generate an LT in a format suitable for the control mode (a normal mode, a through mode or a bulk mode).

The encrypting unit 125 encrypts the LT generated by the copyright information generating unit 123 for preventing illegal usage. Note that, in the through mode, it encrypts the LT in its own encryption method defined under the copyright protection function of the terminal device.

Note that the management device 10 actually requires various components for realizing an authentication function for an equipment authentication and a personal authentication, a tamper-resistant function for secure processing of each function, an accounting management function involving a purchase of an LT, a function of registering and changing the usage rule by an author or a content holder and a power management function, in addition to the above, but these components are not the main features of the present invention, and therefore the figures and explanation of them will be omitted.

FIG. 11 is a diagram showing a format structure of an LT which is distributed from the management device 10 in a normal mode.

An LT 80 includes a header 81 which is not to be encrypted, a payload 82 and a trailer 83 which are to be encrypted.

The header 81 includes a version 811, a length 812, a control mode 813, a cipher type 814, a storable period 815, a content ID 816, etc.

The parameter of the version 811 includes a major area (higher one byte for format change) and a minor area (lower one byte for descriptor addition) for the future extension and improvement of the LT.

The parameter of the length 812, which is provided for identifying a size for encryption and decryption, indicates the entire length of the area which is to be encrypted of the LT (the payload 82 and the trailer 83).

The control mode 813 indicates how to handle the LT in the terminal device so as to adapt to plural copyright management systems, and "1" is stored in the normal mode. "0" and "2" are stored in the through mode and the bulk mode, respectively. Also, the payload 82 in FIG. 11 is in a format of the normal mode ("1").

The parameter of the cipher type 814, which is provided for judging the cipher type, stores the cipher type (non-cipher=0, cipher=1~255) of the payload of the LT.

The parameter of the storable period 815, which is for managing the storable period of the LT, indicates the storable period of the LT (a relative period or an absolute period) by both of the BCD (Binary Coded Decimal) and the MJD (Modified Julian Date) in a year, month, day, hour, minute and second. After the "purchase time + relative period" or the "absolute period" has passed, the LT is nullified. Note that the purchase time is acquired from information other than the LT.

The parameter of the content ID 816 is a unique identifier for specifying a content for usage.

The payload 82 includes a usage rule ID 821 and a descriptor area 822.

The parameter of the usage rule ID 821 is a unique identifier for specifying a usage rule, doubles with a function of a random number area for encryption, and can also be used for preventing illegal copying.

The parameter of the descriptor area 822 includes a content key descriptor 8221 including a content cipher type, a preview key descriptor 8222 including a preview cipher type and an action descriptor 8223 that is a descriptor of a variable length which various rights (actions) corresponding to the content attributes can be added to or deleted from.

Figure 12:
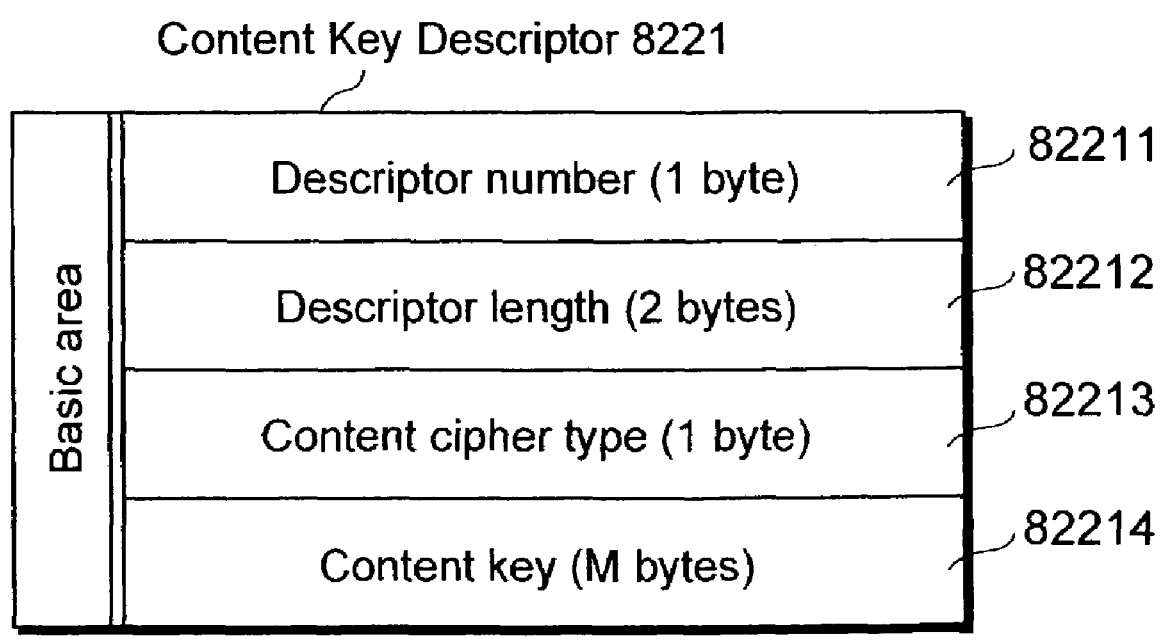
FIG. 12 is a diagram showing a format structure of a content key descriptor 8221 as shown in FIG. 11.

FIG. 12 is a diagram showing a format structure of the content key descriptor 8221 as shown in FIG. 11.

As shown in this figure, the content key descriptor 8221 includes a basic area including parameters of a descriptor number 82211, a descriptor length 82212, a content cipher type 82213 and a content key 82214, etc.

The parameter of the descriptor number 82211 stores "0" indicating that the descriptor type is a content key descriptor.

The parameter of the descriptor length 82212 stores "0"~"65535" indicating the length of the descriptor 8221. The length of the content key is calculated from this descriptor length 82212.

The parameter of the content cipher type 82213 stores the encryption type, etc. of the content (0: non-cipher, 1~255: cipher).

The parameter of the content key 82214 stores a key of a variable length for decrypting the encrypted content.

Figure 13:
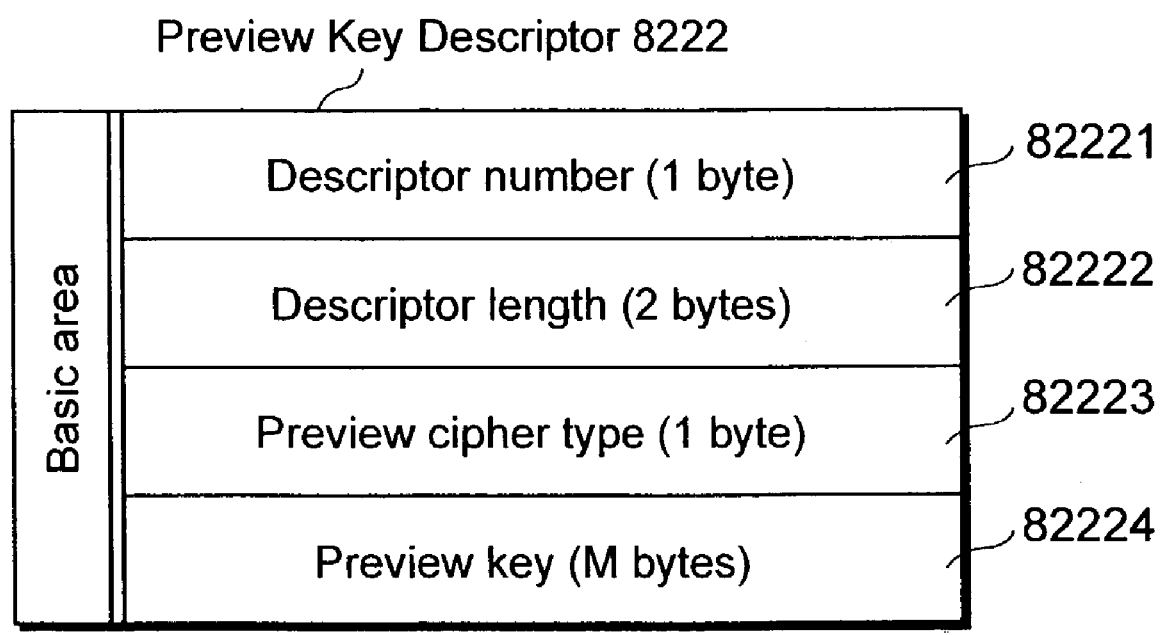
FIG. 13 is a diagram showing a format structure of a preview key descriptor 8222 as shown in FIG. 11.

FIG. 13 is a diagram showing a format structure of the preview key descriptor 8222 as shown in FIG. 11.

As shown in this figure, the preview key descriptor 8222 includes a basic area including parameters of a descriptor number 82221, a descriptor length 82222, a preview cipher type 82223, a preview key 82224, etc.

The parameter of the descriptor number 82221 stores "1" indicating that the descriptor type is a preview key descriptor.

The descriptor length 82222 stores "0"~"65535" indicating the length of the descriptor 8222. The length of the preview key is calculated from the descriptor length 82222.

The parameter of the preview cipher type 82223 stores the cipher type, etc. of the preview content (0: non-cipher, 1~255: cipher).

The parameter of the preview key 82224 stores a key of a variable length for decrypting the encrypted preview content.

Figure 14:
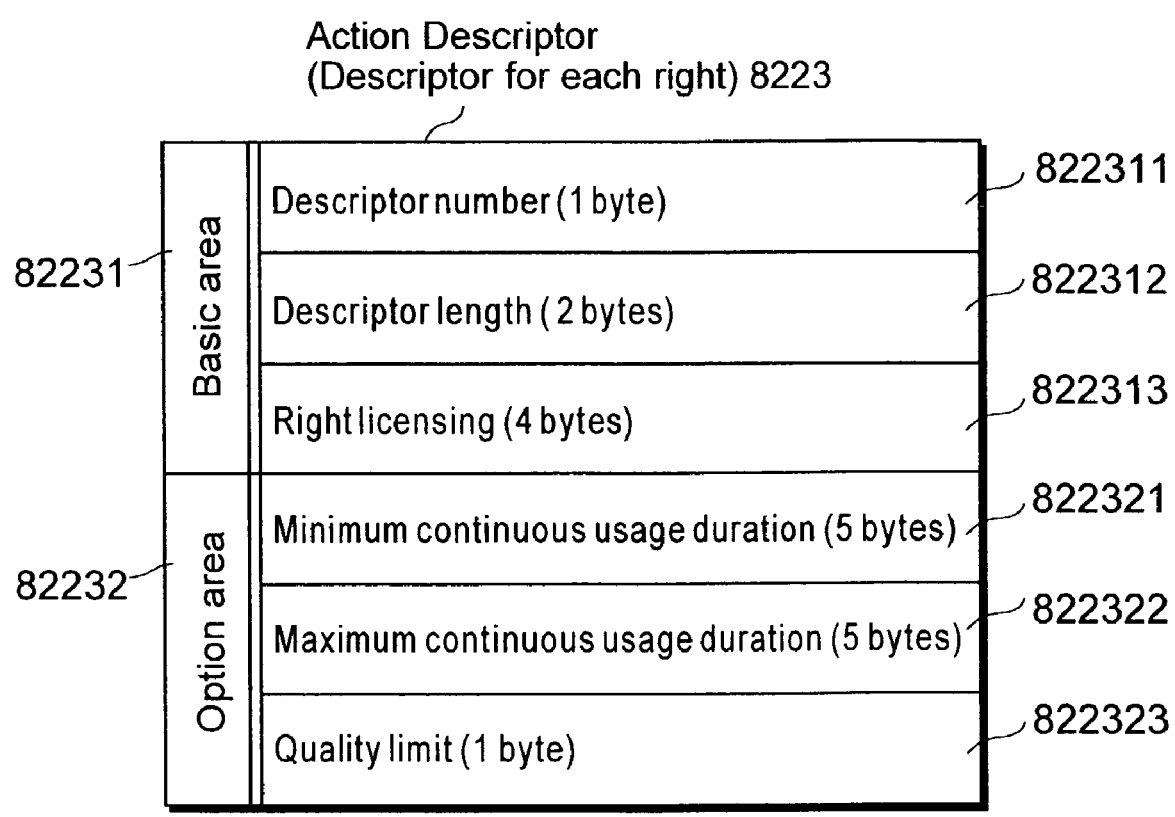
FIG. 14 is a diagram showing a format structure of an action descriptor 8223 as shown in FIG. 11.

FIG. 14 is a diagram showing a format structure of the action descriptor 8223 as shown in FIG. 11.

As shown in this figure, the action descriptor 8223 includes a required basic area 82231 including a descriptor number 822311, a descriptor length 822312 and a right licensing 822313, and an option area 82232 which is added to the predetermined usage rules if necessary including a minimum continuous usage duration 822321, a maximum continuous usage duration 822322 and a quality limit 822323.

The parameter of the descriptor number 822311 stores a numerical value corresponding to an action type. Specifically, "2", "3", "4", "5" and "6" are stored for a playback right descriptor, a moving right descriptor, a copying right descriptor, a printing right descriptor and a modification right descriptor, respectively. Note that "7"~"255" are reserved for other actions.

The parameter of the descriptor length 822312 stores "0"~"65535" indicating the length of the descriptor 8223.

The parameter of the right licensing 822313 stores one of "Never be used" (Never=0×0), "Can be used once" (Once=0×1), "Can be used specified plural times" ("0×2 (twice)"~"0×FFFFFFFD (4294967293 times)"), "No limit of times", that is "Can be used freely" (Free=0×FFFFFFFE), and "Ask the management device 10 and Can be used the minimum time cut out from the usage right", that is "Once" (Ask=0×FFFFFFFF).

The minimum continuous usage duration 822321, which can be set for the playback right only, indicates a time duration of a content usage from the usage start time which is decided to be one-time usage of the content in a year, month, day, hour, minute and second specified by both the BCD and the MJD. When the minimum continuous usage duration for three-minute music is specified as 30 seconds, for example, it is counted as one-time usage at the time when 30 seconds has passed since the playback started.

The maximum continuous usage duration 822322, which can be set for the playback right only, indicates the maximum length of time to use the content continuously from the playback start in a year, month, day, hour, minute and second specified by both the BCD and the MJD. Even if the content is a one-hour-long movie and you have to suspend (pause) its playback for some reason such as going to the bathroom, for example, it is usually set longer than one hour (three hours, for instance), and the playback of the content is terminated at the time when 3 hours has passed since the playback started.

The parameter of the quality limit 822323 can be set for one of the playback right, copying right or printing right. In the quality limit 822323, the quality of the content is, such as, an intensity level of black and white, a definition level (standard or high) of colors, etc.

The trailer 83 includes the parameter of the manipulation detection 831, and the manipulation detection 831 stores a hash value which is obtained by encryption by a SHA-1 or the like for the header 81 and the payload 82.

Note that the contents and the size of each parameter included in the LT are just shown as examples, and they are not limited to these described ones.

Figure 15:
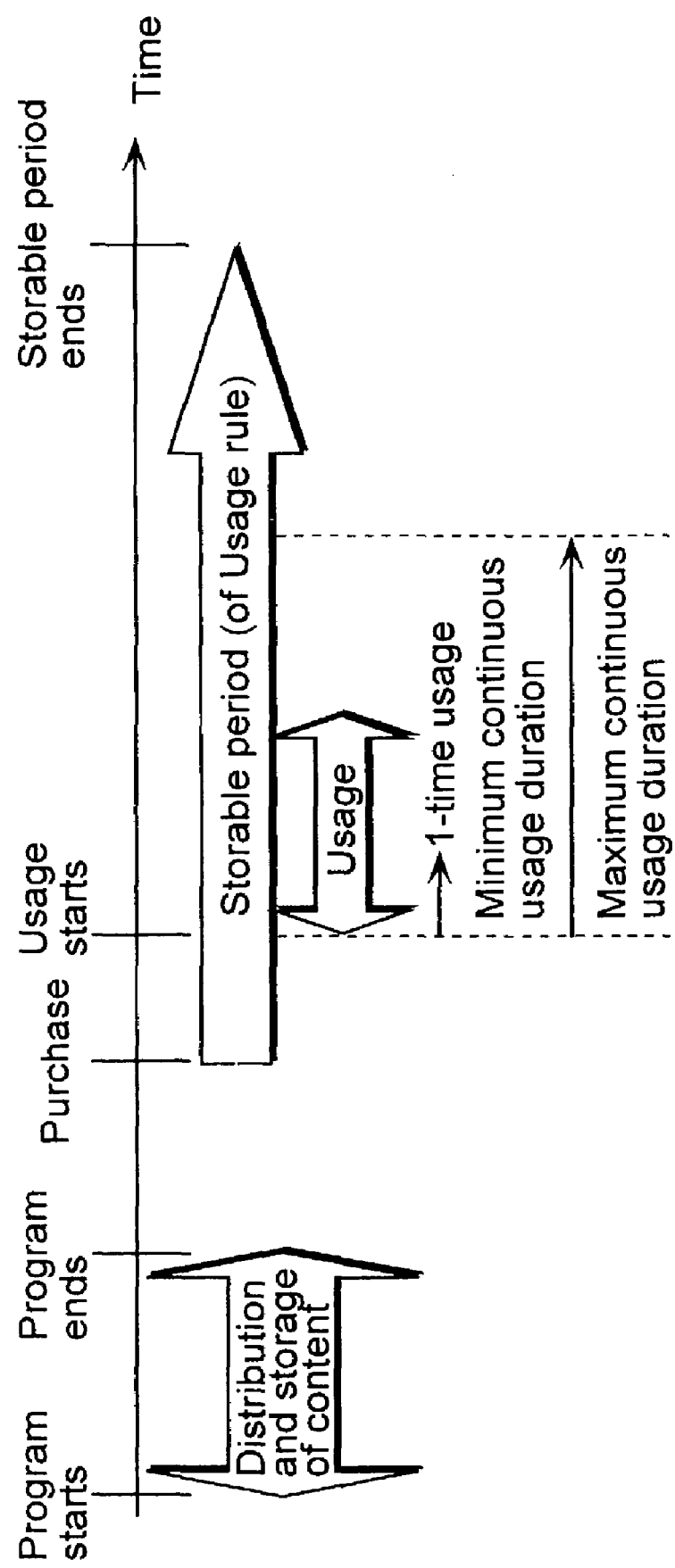
FIG. 15 is a diagram showing a relationship among a storable period (effective period of time), a minimum continuous usage duration and a maximum continuous usage duration.

Here, relationship between the effective period 815 as shown in FIG. 11 and the minimum continuous usage duration 822321 or the maximum continuous usage duration 822322 as shown in FIG. 14 will be explained using FIG. 15.

For example, when a person finds a content the person wants to view in a bill of fare, the person receives the distribution of the content as scheduled of the bill and stores it in a storing unit like a hard disk. Then the person does through a procedure for purchasing the right of viewing the content, and receives the distribution of the LT after the usage request. When the LT is distributed, clocking of the storable period of the LT starts. When the playback of the content starts, clocking of the minimum continuous usage duration and the maximum continuous usage duration starts. And when the minimum continuous usage duration has passed, it is decided to be one-time usage. The person can view the content until the shorter one of the maximum continuous usage duration or the duration up to the end of the storable period of the LT has passed during the continuous playback of the content (including a pause in the middle of the playback), even if the minimum continuous usage duration has passed. When the shorter one of the maximum continuous usage duration or the duration up to the end of the storable period of the LT has passed after the lapse of the minimum continuous usage duration, the usage rule of one-time usage is nullified, and then the LT is nullified if there is no other remaining usage rule. Highly accurate time management like this can be used not only in the normal mode but also in the through mode and the bulk mode.

Accordingly, when the time management of the storage medium or the printer is more accurate than that of the relay device, the effect of preventing lowered accuracy of managing time information caused by the lower performance of the relay device can be obtained.

Figure 16:
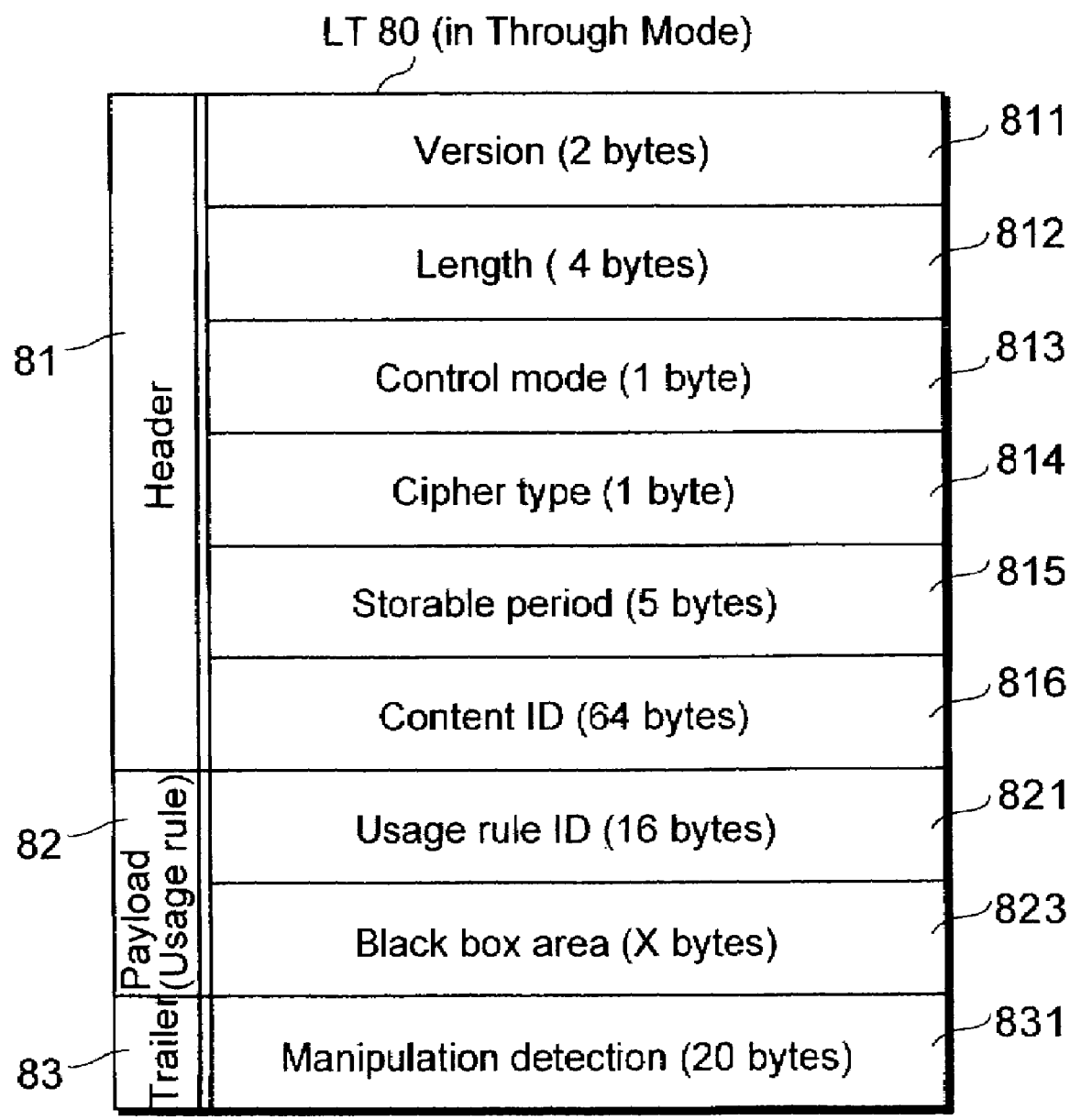
FIG. 16 is a diagram showing a format structure of an LT in a through mode.

FIG. 16 is a diagram showing a format structure of an LT in a through mode.

Note that the same numerical codes are attached to, the areas corresponding to those of the LT in the normal mode, and explanation of them will be omitted.

In the LT in the through mode, instruction information (0=through mode) is embedded in the control mode 813, and a black box area 823 is stored instead of the descriptor area 822. The black box area 823 stores control information of a content (playback/moving/copying/printing/modification/ . . . ), a usage rule (usage right for N times), a usable starting time, a usable ending time, etc. which the copyright information converting unit 130 sets based on the usage environment information of the terminal device and in accordance with the copyright protection system depending upon the terminal device such as the storage medium, the printer, etc. Furthermore, the copyright information converting unit 130 can set the above-mentioned minimum continuous usage duration and the maximum continuous usage duration, and in addition, it can set freely various parameters in accordance with the copyright protection system. These parameters and others are stored in the black box area 823.

The black box area 823 is regarded as an encapsulated black box area in the relay device and is never interpreted.

Figure 17:
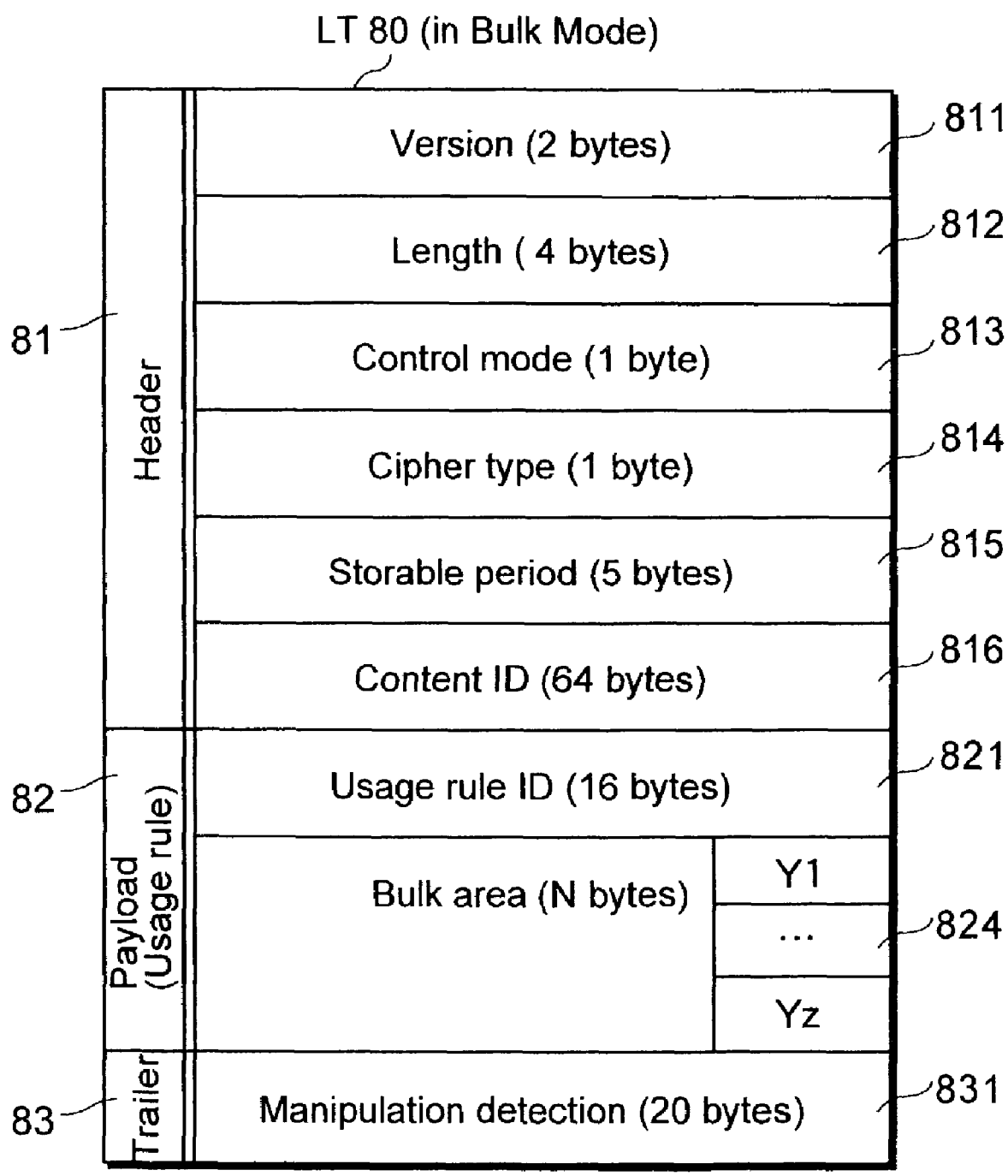
FIG. 17 is a diagram showing a format structure of an LT in a bulk mode.

FIG. 17 is a diagram showing a format structure of an LT in a bulk mode.

Note that the same numerical codes are attached to the areas corresponding to those of the LT in the normal mode, and explanation of them will be omitted.

In the LT in the bulk mode, instruction information (2=bulk mode) is embedded in the control mode 813, and a bulk area 824 is stored instead of the descriptor area 822. The bulk area 824 stores a plurality of control information (playback/moving/copying/printing/modification/ . . . ) and usage rules (a content key, preview key, number of times, etc.) of a content which the copyright information converting unit 130 sets in accordance with the copyright protection system depending upon the terminal device such as the storage medium, etc. in various usage manners (formats) but with the same contents. Also, the copyright information converting unit 130 can set the above-mentioned minimum continuous usage duration and the maximum continuous usage duration, and in addition, it can set freely various parameters in accordance with the copyright protection system, and these parameters and others are stored in the bulk area 824.

The relay device decides a processible format among a plurality of formats stored in the bulk area 824 and selects the first-found one. The other unselected usage rules are nullified.

Note that the contents and size of each parameter included in the LT are shown as examples, and are not limited to the described ones.

Also, the present invention includes such a variation as the case where the contents of the parameters included in FIG. 16 and FIG. 17 are distributed in the through mode or the bulk mode in other formats than that of the usage rule as shown in these figures.

Furthermore, the present invention includes such a variation as the case where the format of the copyright-related information which is stored and managed in the management device 10 is distributed as it is and is converted into a format which can perform the processing of the copyright information of the SD card 40 or the printer 50 in the device interface processing unit 320 of the relay device 30.

Figure 18:
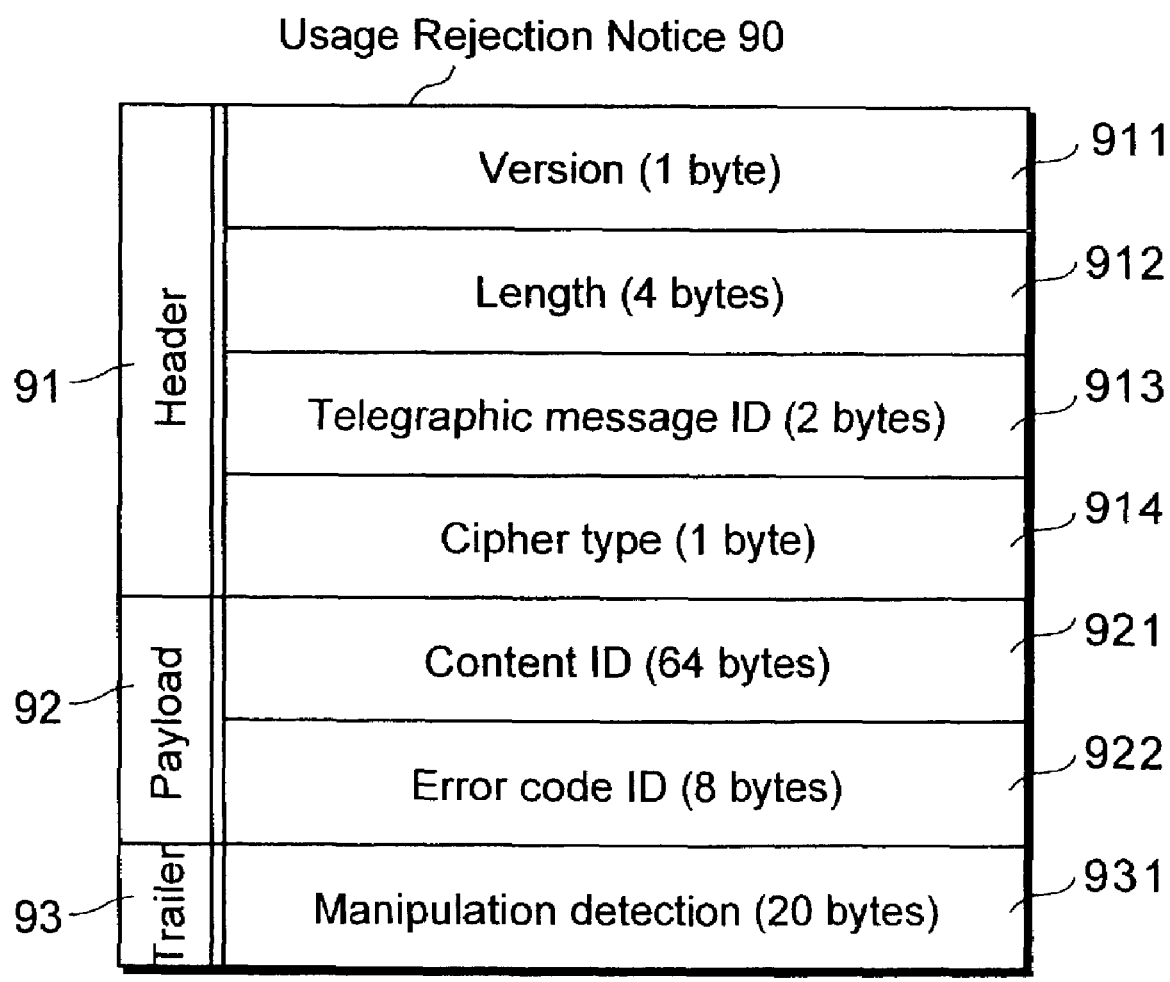
FIG. 18 is a diagram showing a format structure of a usage rejection notice.

FIG. 18 is a diagram showing a format structure of a usage rejection notice 90 which is distributed from the management device 10 or the relay device 30.

The usage rejection notice 90 includes a header 91 which is not to be encrypted, and a payload 92 and a trailer 93 which are to be encrypted.

The header 91 includes a version 911, a length 912, a telegraphic message ID 913 and a cipher type 914.

The version 911 is for notifying a usage rejection for future extension and improvement of a usage request and usage environment information notice, and stores numerical values "0"~"255".

The length 912 is for identifying a size for encryption/decryption, and indicates the entire length of a variable encryption area.

The telegraphic message 913 indicates that a telegraphic message is a usage rejection notice, etc., and stores "0×1030" and "0×1000" for the usage rejection notice and the rejection flag, respectively.

The cipher type 914 is for judging a cipher type, and indicates a cipher type (non-cipher=0, cipher=1~255) of a telegraphic message cipher area.

The payload 92 includes a content ID 921 and an error code 922.

The content ID 922 is a unique identifier for specifying a content, and corresponds to a content ID for the usage request.

The error code 922 clearly indicates a rejection reason, and stores "0×0", "0×1", "0×2", "0×3" and "0×4" for no contract, no purchase, no usage capability due to age or region, unsupported version and timeout due to equipment failure, etc, respectively.

The trailer 93 stores manipulation detection 931 for detecting manipulation, and the manipulation detection 931 stores a hash value which is obtained by a SHA-1 or the like for the header 91 and the payload 92.

Note that the contents and the size of each parameter included in the descriptors as shown in FIGS. 12, 13 and 14 are just shown as examples, and they are not limited to these described ones.

Also, the data formats are described in FIGS. 11, 12, 13, 14, 16 and 17 on the assumption that the data is binary, but text data like an XML (extensible markup language) or digital watermark distribution can also be realized in the same manner.

Next, processing in each device will be explained sequentially.

Figure 19:
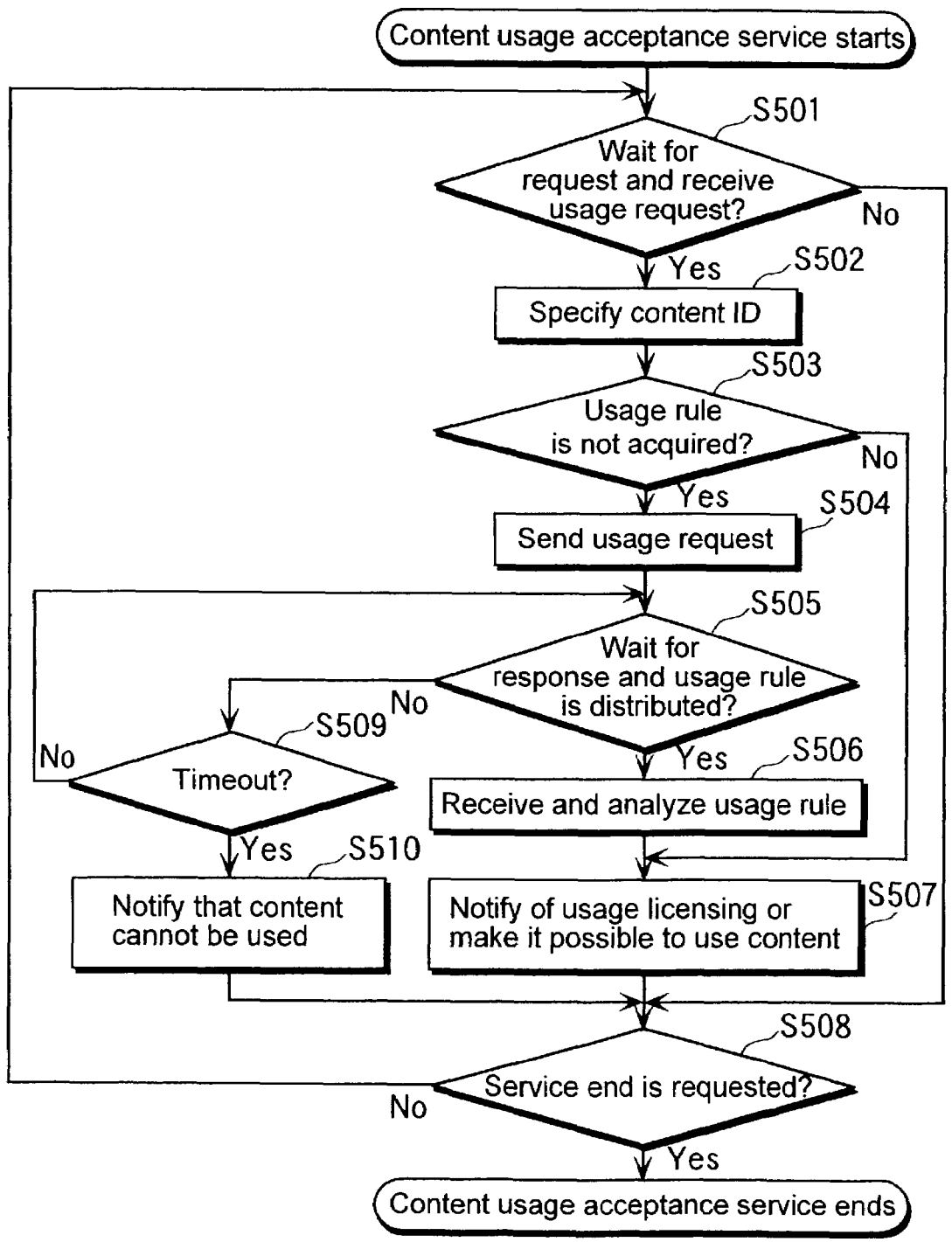
FIG. 19 is a flowchart of a content usage acceptance service processing which the printer 50 performs.

FIG. 19 is a flowchart showing the processing of the printer 50, etc.

Since the processing of the digital TV 20, the processing in the case where the relay device 30 itself uses a content and the processing of the SD player 45 with the SD card 40 inserted in it are approximately same as that of the printer 50, the processing of the printer 50 will be explained as a typical example.

First, a user of a content connects the printer 50 to the relay device 30.

The user interface unit 510 waits for various requests from the user, and transfers the request to the copyright request processing unit 521 of the copyright information processing unit 520 when the request is a usage request (Yes in S501). This usage request corresponds to a printing request for acquiring an LT with a 100-sheet printing right as shown in FIG. 1, for instance. The copyright request processing unit 521 specifies the content ID of the content which is subject to the usage request transferred from the user interface unit 510 (S502), and inquires of the storing unit 5221 of the copyright deciding unit 522 whether it acquires (holds) the LT corresponding to the content ID or not (S503).

When the storing unit 5221 of the copyright deciding unit 522 does not acquire the LT as a result of the inquiry (Yes in S503), the copyright request processing unit 521 generates a message for the usage request only (number of usage environment information=0) in a format of the usage environment information 70, and the sending and receiving unit 530 sends the generated message of the usage request to the relay device 30 (S504). And the sending and receiving unit 530 waits for the LT to be distributed from the relay device 30 within a predetermined time (No in S505, No in S506).

When the sending and receiving unit 530 receives the LT of the content distributed from the relay device 30 within a predetermined time (No in S509, Yes in S505), it transfers the received LT to the copyright deciding unit 522 in the copyright information processing unit 520, and the copyright deciding unit 522 stores the transferred LT in the storing unit 5221 and then analyzes the contents of the LT (such as a usage rule) (S506).

Based on the usage rule of the acquired LT, the copyright deciding unit 522 notifies the content user via the user interface unit 510 that the usage license is granted, that is, the user can use the content (S507).

As a result, the licensing processing for the use of the content is completed, and the user can use the content within the limit of the usage rule (print 100 sheets).

When there is no response from the relay device 30 after a predetermined time has passed since the usage request was made (No in S505, Yes in S509), the sending and receiving unit 530, as timeout processing, notifies the user via the user interface unit 510 that he/she cannot use the content in the format of the usage rejection notice 90 (S510).

On the other hand, when the storing unit 5221 of the copyright deciding unit 522 has acquired the LT corresponding to the usage request in Step S503 (Yes in S503), the copyright request processing unit 521 transfers the usage request to the copyright deciding unit 522 without making a usage request to the relay device 30. The copyright deciding unit 522 which receives the usage request notifies the user via the user interface unit 510 that he/she can use the content (S507).

And when there is no request of terminating the service from the content user (No in S508), the user interface unit 510 waits for a predetermined usage request of the content from the user and continues the processing, and when there is a request of terminating the service from the content user (Yes in S508), the content usage service ends.

By repeating this processing, the desired LT can be acquired. In using the content, the user can use the content within the limit of the usage rule by decrypting the encrypted content by the decrypted content key or decrypting the encrypted preview content by the decrypted preview key after the encrypted LT is decrypted. And when the user goes beyond the limit of the usage rule, the copyright deciding unit 522 extinguishes the LT.

Note that when the digital TV 20 makes a content usage request or the relay device 30 uses a content in itself, each unit of the digital TV 20 and the relay device 30 performs approximately same operations as that of the printer 50. However, the digital TV 20 and the relay device 30 further include the usage environment information managing units 230, 340, so they are different from the printer 50 in that they send the usage environment information along with the usage request or separately in Step S504 as shown in FIG. 19.

The processing in the SD player 45 with the SD card 40 inserted in it is same as that of the printer 50, and in the SD player 45, the usage request is transferred from the SD card 40 to the relay device 30 or the LT is transferred from the relay device 30 to the SD card 40 wireless, etc.

Next, the usage request acceptance processing of the terminal devices (the SD card 40 and the printer 50) which is performed in the relay device 30 will be explained.

Figure 20:
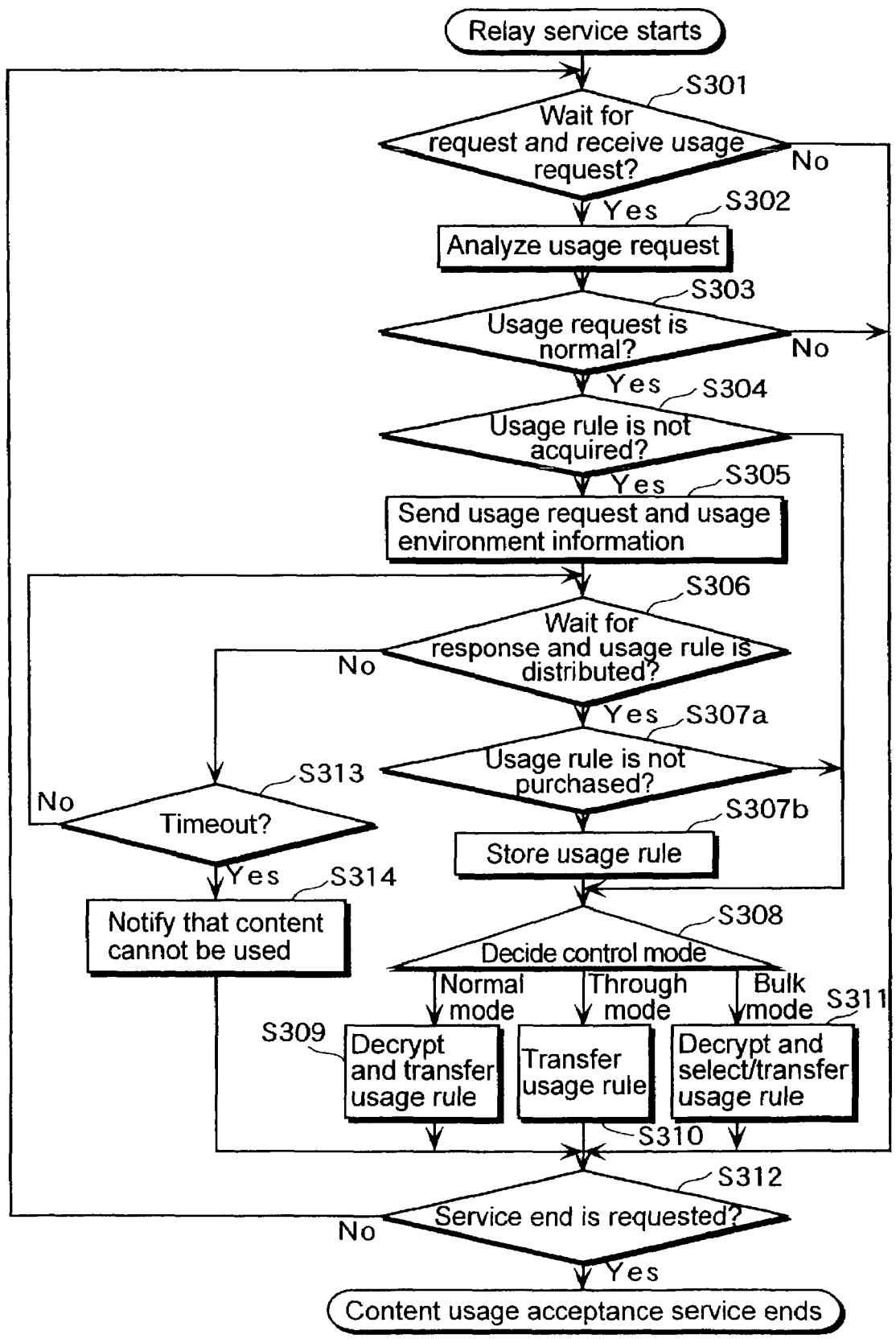
FIG. 20 is a flowchart of a content usage relay service processing which the relay device 30 performs.

FIG. 20 is a flowchart showing the usage request acceptance processing of the terminal device which is performed in the relay device 30.

As for the SD card 40, the relay device 30 can perform the usage request acceptance processing instead of the SD card 40 by connecting the SD card 40 to the relay device 30. Therefore, as for the acceptance of the usage request from the SD card 40 to the relay device 30, the acceptance processing in the case where the SD card 40 is connected to the relay device 30 will be explained here.

When a user uses a content by the SD card 40, he/she first connects the SD card 40 to the device interface processing unit 320 of the relay device 30. Then he/she inputs a usage request by operating the user interface unit 310. This usage request corresponds to the request of 3-time playback right on the SD memory card connected to the relay device 30 as shown in FIG. 1. The usage request is transferred from the user interface unit 310 to the device interface processing unit 320. Note that the usage request from the printer 50 is transferred to the device interface processing unit 320.

When the request accepting unit 321 in the device interface processing unit 320 receives a usage request directly from the printer 50 via the user interface unit 310 for the SD card 40 (Yes in S301), it sends the request to the copyright request processing unit 331 of the copyright information processing unit 330. The copyright request processing unit 331 analyzes the received usage request (S302), and judges whether the usage request is normal or not (S303).

When the usage request is normally analyzable (Yes in S303), the copyright request processing unit 331 transfers the analyzed usage request to the copyright storage processing unit 332 in order to check whether the LT corresponding to the usage request is acquired (held) in the storing unit 3321 of the copyright storage processing unit 332.

When the LT corresponding to the usage request is not acquired in the storing unit 3321 (Yes in S304), the copyright storage processing unit 332 transfers the usage request to the usage environment information managing unit 340.

The usage environment information managing unit 340 makes a message which stores the usage request and the usage environment information, and sends the message to the sending and receiving unit 350. The sending and receiving unit 350 sends the received message which stores the usage environment information and usage request to the management device 10 via the network 60 (S305). The sending and receiving unit 350 waits for the LT to arrive from the management device 10 within a predetermined time (No in S306, No in S313).

The usage environment information managing unit 340 manages the usage environment information of its own terminal and the usage environment information of the printer 50 and the SD card 40 which are connected to its own terminal. As for the usage request to the SD card 40, the usage environment information managing unit 340 stores in the message the usage environment information of the SD card 40 (a content user ID "0×3", a terminal ID "0×4", a copyright protection function type (a version, playback (plural times are possible), moving) and reservation (a usage history, etc.)) and the usage environment information of its own terminal (a content user ID "–", a terminal ID "0×30", a copyright protection function type (a version, playback (one time), moving) and reservation (a usage history, etc.)) in this order.

As for the usage request from the printer 50, the usage environment information managing unit 340 stores in the message the usage environment information of the printer 50 (a content user ID "0×4", a terminal ID "0×50", a copyright protection function type (unknown) and reservation (a usage history, etc.)) and the usage environment information of its own terminal in this order.

When the sending and receiving unit 350 receives the LT within a predetermined time (No in S313, Yes in S306), it transfers the received LT to the copyright storage processing unit 332.

The copyright storage processing unit 332 judges whether the received LT does not correspond to the usage request from the terminal device, that is, it is unpurchased (S307*a*). When the LT is unpurchased (Yes in S307*a*), the copyright storage processing unit 332 stores the LT in the storing unit 3321 (S307*b*). When the usage rule (LT) is purchased (No in S307*a*), the copyright storage processing unit 332 performs the control mode decision processing (S308) immediately.

This processing (5307*a*, 5307*b*) is provided on the assumption that the LT is distributed to the relay device 30 earlier than the content itself using one-way broadcasting as a network. When the LT is distributed to the relay device 30 in advance, the LT can be distributed to the user terminal device from the relay device 30 without being transferred to the management device 10 immediately after there comes a usage request from the terminal device of the user who has completed the procedure such as a purchase of the content license.

The LT is usually distributed after the purchase of the content when high-speed two-way communication is used as a network, the processing of receiving only the LT corresponding to the purchased content is described here. Therefore, the LT is not usually stored, but the LT for free usage is decrypted and re-encrypted, and then stored.

In the control mode decision processing in Step S308, the copyright processing mode deciding unit 333 decides the control mode; a through mode, a normal mode or a bulk mode, by referring to the control mode that is the parameter of the LT.

When the control mode is the through mode, the copyright processing mode deciding unit 333 distributes the LT to the higher intelligent device connecting unit 322 as it is, the higher intelligent device connecting unit 322 distributes the LT to the terminal device (the SD card 40 or the printer 50) (S310). In other words, the copyright processing mode deciding unit 333 distributes the LT as it is without performing any processing for it, even when the right information in the black box area 823 of the LT as shown in FIG. 16 is encrypted.

When the control mode is the normal mode, the copyright storage processing unit 332 transfers the LT to the decrypting unit 334. The decrypting unit 334 decrypts the encrypted LT (the payload 82 and the trailer 83), and transfers it to the copyright information converting unit 335. The copyright information converting unit 335 distributes the decrypted LT to the terminal device (the SD card 40 or the printer 50) which is connected to itself via the lower intelligent device connecting unit 323 according to each of the formats as shown in FIGS. 11~14 (S309).

Note that the copyright information converting unit 335 refers to the right license of the decrypted usage rule (LT) after the distribution of the LT, and judges whether the rule of free usage is included or not. When the rule of free usage is included, the copyright information converting unit 335 re-encrypts the free usage rule only and has the storing unit 3321 of the copyright storage processing unit 332 store it in order to reuse the right in the copyright storage processing unit 332. In other cases, the copyright information converting unit 335 nullifies the remaining LTs.

When the control mode is the bulk mode, the copyright processing mode deciding unit 333 transfers the LT of the bulk mode to the decrypting unit 334. The decrypting unit 334 decrypts the encrypted LT (the payload 82 and the trailer 83), and the copyright information converting unit 335 selects one usage rule in a format analyzable in the printer 50 connected to the relay device 30 among one or more formats of the right information in the bulk area as shown in FIG. 17, re-encrypts the LT including the selected right information, then transfers it to the lower intelligent device connecting unit 323, and distributes it to the terminal device (the printer 50) (S311). In this case, the LT is distributed according to the format as shown in FIG. 17.

Note that when there is something abnormal in the usage request which is received from the SD card 40 or the printer 50 (No in S303), the copyright request processing unit 331 nullifies the abnormal usage request, notifies the requesting device of its rejection, and waits for a request (S312, S301).

Also, when the copyright storage processing unit 332 has already stored the LT corresponding to the usage request (No in S304), it transfers the stored LT (unpurchased LT for free usage) to the copyright processing mode deciding unit 333, and the copyright processing mode deciding unit 333 decides the control mode (S308).

On the other hand, when there is no response after a predetermined time has passed since the relay device 30 made the usage request (Yes in S313), the copyright storage processing unit 332 notifies the printer 50 via the device interface processing unit 320 that the LT is unusable, as timeout processing in the sending and receiving unit 350 (S314). In this case, a rejection code is set for a usage rejection notice indicating that the usage is rejected due to timeout according to the format as shown in FIG. 18.

When there is no service end request from the content user (No in S312), the request accepting unit 321 waits for a usage request for a predetermined content from the content user. When there is a service end request from the content user (Yes in S312), the content usage service ends.

By repeating this processing, the usage request from the terminal device is accepted and responded, and therefore the LT in a mode suitable for the terminal device can be distributed.

Figure 21:
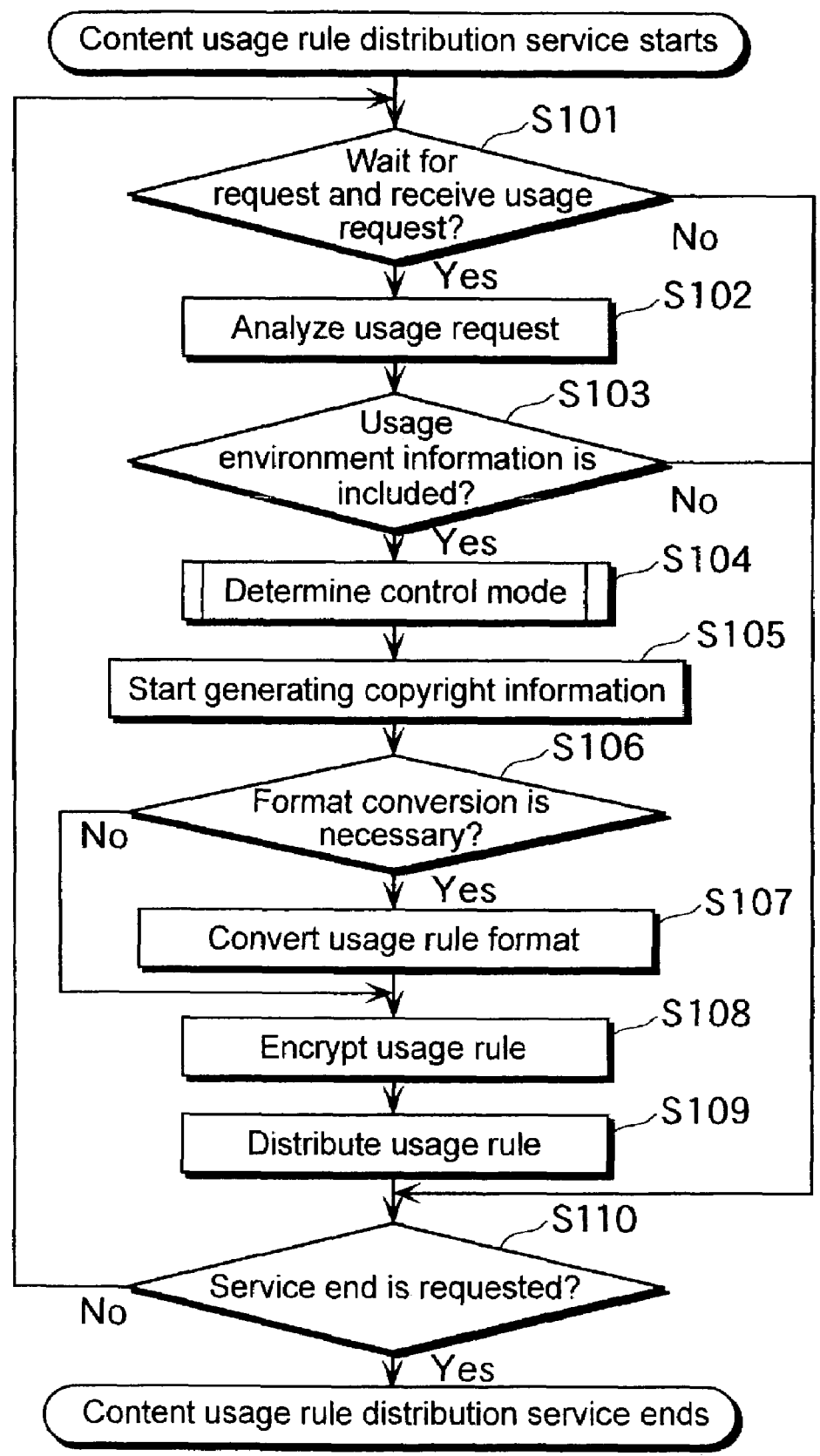
FIG. 21 is a flowchart of a content usage rule distribution service processing which the management device 10 performs.
Figure 22:
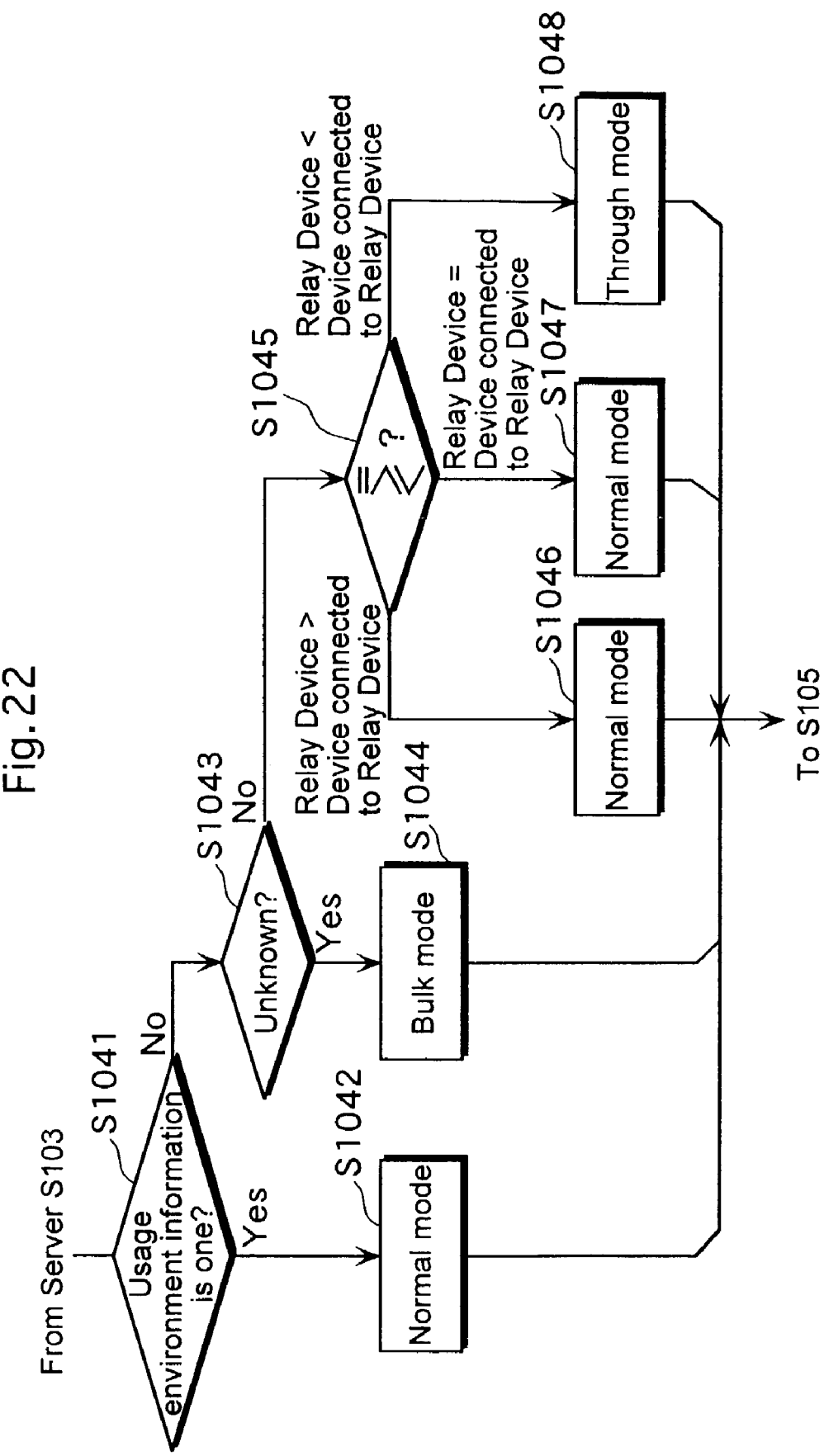
FIG. 22 is a flowchart showing details of control mode determination processing as shown in FIG. 21.

FIG. 21 and FIG. 22 are flowcharts showing the flow of the processing of the management device 10.

When the sending and receiving unit 110 of the management device 10 receives a message in the format as shown in FIG. 18 including a usage request via the network 60 (Yes in S101), the usage request analyzing unit 121 analyzes the usage request (S102). When the message does not include the usage request in Step S101, the message is nullified.

After the analysis of the usage request, it is judged whether the above message includes the usage environment information or not (S103). When the message includes the usage environment information (Yes in S103), the control mode of the LT which is to be generated based on the analysis result of the usage environment information is determined (S104). Note that when the message does not include the usage environment information in Step S103, the message is nullified.

FIG. 22 is a flowchart showing the details of the control mode decision processing (S104) as shown in FIG. 21.

As shown in this figure, the usage environment information analyzing unit 122 first analyzes whether the usage environment information is one or more, that is, whether the usage environment information is only that of the device connected to the network 60 (the digital TV 20 or the relay device 30) (S1041). When the information is one (Yes in S1041), the usage environment information analyzing unit 122 determines the control mode of the LT which is to be generated as the normal mode (S1042). When the usage environment information is two or more (No in S1041), the usage environment information analyzing unit 122 judges whether the copyright protection function type 7233 (See FIG. 9) of the usage environment information in the device connected to the relay device 30 (the SD card 40 or the printer 50) is unknown or not (S1043). This "unknown" state occurs specifically when the relay device 30 cannot acquire the information corresponding to the copyright protection function type 7233 or when the management device 10 cannot comprehend the information even if the relay device 30 acquires it.

When the copyright protection function type 7233 is unknown (Yes in S1043), the usage environment information analyzing unit 122 determines the control mode of the LT which is to be generated as the bulk mode (S1044).

When it is not unknown (No in S1043), the usage environment information analyzing unit 122 compares the processing capability for LTs between the usage environment information of the relay device 30 and that of the device connected to the relay device 30 (S1045).

When the relay device 30 has an equal or higher capability of processing LTs than the device connected to the relay device 30, the usage environment information analyzing unit 122 determines the control mode of the LT which is to be generated as the normal mode (S1046, S1047).

On the other hand, when the relay device 30 has a lower capability than the device connected to the relay device 30, the usage environment information analyzing unit 122 determines the control mode of the LT which is to be generated as the through mode (S1048). In other words, when the copyright information processing function of the terminal device (the SD card 40 or the printer 50) is more intelligent than that of the relay device 30, or more specifically, when the terminal device which supports plural uses of the usage rule of the playback function can perform higher functional processing than the relay device 30 which supports only one-time use of the usage rule of the playback function, the usage environment information analyzing unit 122 determines the control mode as the through mode.

After determining the control mode, the usage environment information analyzing unit 122 requests the copyright information generating unit 123 to generate an LT, and according to the instruction of the usage environment information analyzing unit 122, the copyright information generating unit 123 starts generating the LT in the normal mode format (S105) and prepares the LT of the normal mode by reading out the usage rule of the requested equipment ID which is managed in the copyright-related information DB 124, the content key for decrypting the content and the preview key for decrypting the preview content. Note that the usage rule which is managed in the copyright-related information DB 124 is subtracted by just what is read out.

When the copyright information generating unit 123 completes preparation of the LT of the normal mode format, it judges whether the format of the descriptor area 822 that is the right information such as the usage rule needs to be converted or not based on the control mode determined by the usage environment information analyzing unit 122 (S106).

When the format needs to be converted (Yes in S106), that is, when the control mode determined by the usage environment information analyzing unit 122 is a through mode, for example, the copyright information generating unit 123 transfers the descriptor area 822 that is the right information to the copyright information converting unit 130 so as to have it converted into the black box area 823 that is the right information in the through mode (S107). After the conversion, the copyright information generating unit 123 exchanges the descriptor area 822 of the LT for the black box area 823, generates the LT of the through mode (See FIG. 23A) by rewriting the control mode 813 from "1" into "0", and transfers the LT to the encrypting unit 125.

Furthermore, when the format conversion is needed (Yes in S106) and the control mode determined by the usage environment information analyzing unit 122 is a bulk mode, the copyright information generating unit 123 transfers the descriptor area 822 that is the right information to the copyright information converting unit 130 so as to have it converted into the bulk area 824 in the bulk mode (S107). After the conversion, the copyright information generating unit 123 exchanges the descriptor area 822 of the LT for the bulk area 824, generates the LT of the bulk mode (See FIG. 23B) by rewriting the control mode 813 from "1" into "2", and transfers the LT to the encrypting unit 125.

When the format conversion is not needed (No in S106), the copyright information generating unit 123 transfers the prepared LT of the normal mode to the encrypting unit 125.

In the through mode, the copyright information converting unit 130 converts the right information into that in the format in accordance with the copyright protection system of the device to be connected (such as the SD card 40) ("three-time playback right", for example) as the information which is to be stored in the black box area 823. Also, in the bulk mode, the copyright information converting unit 130 converts the right information into that with the same contents in all the formats processible according to the copyright protection system of the device to be connected (such as the printer 50) (a bulk of all the formats corresponding to 100-sheet printing right, that is, "100-sheet printing right", "one-sheet printing right×100", etc.) as the information which is to be stored in the bulk area 824.

The encrypting unit 125 encrypts the payload 72 and the trailer 73 of the LT which is transferred from the copyright information generating unit 123 in order to prevent an illegal usage (S108). Note that in the through mode, the encrypting unit 125 encrypts the LT by its own encryption method which is defined by the copyright protection function of the SD card 40.

The sending and receiving unit 110 distributes the LT which is encrypted by the encrypting unit 125 to the terminal device which sends the usage request (the digital TV 20 or the relay device 30) via the network 60 (S109). And the sending and receiving unit 110 judges whether there is a service end request or not (S110). When there is no service end request (No in S110), the processing flow returns to the acceptance processing of the message for the next usage request, and when there is a service end request (Yes in S110), the usage rule distribution service ends.

By repeating this processing, the usage request from the terminal device or the usage request from the terminal device via the relay device 30 is accepted, and the usage request is responded to without being harmed by the processing capability of the relay device 30 even if its processing capability is lower, and therefore the LT in a mode suitable for the terminal device can be distributed.

Next, communication between the SD card 40, the printer 50, the relay device 30 and the management device 10 of the license management system 1 will be explained.

FIG. 24A and 24B are sequences showing communication between the SD card 40, the printer 50, the relay device 30 and the management device 10 which are included in the license management system 1.

First, communication between the SD card 40, the relay device 30 and the management device 10 as shown in FIG. 24A will be explained.

When the SD card 40 is connected to the relay device 30, the relay device 30 acquires the usage environment information β of the SD card 40 (S1). The relay device 30 accepts the usage request from the SD card 40 (S2). When the relay device 30 accepts the usage request, it sends the usage environment information β of the SD card 40 and the usage environment information γ of the relay device 30 to the management device 10 along with the usage request or separately (S3).

When the management device 10 receives the usage request, it generates the LT of the through mode based on the usage environment information β of the SD card 40, the usage environment information δ of the relay device 30 and the usage request (S4) (See FIG. 23A), and transfers the generated LT of the through mode to the relay device 30 (S5).

When the relay device 30 receives the LT, it sees the control mode of the LT to confirm that it is the through mode (T) and has this LT go through without performing any processing so as to transfer the LT to the SD card 40 (S7).

As a result, the license information which is issued by the management device is transferred to the terminal device as it is, and therefore occurrence of the problem that the usage rule of the content indicated by the license information is restricted by the relay device can be avoided.

Next, communication between the printer 50, the relay device 30 and the management device 10 as shown in FIG. 24B will be explained.

When the printer 50 is connected to the relay device 30, the relay device 30 acquires the usage environment information δ (the version, etc. is unknown) of the printer 50 (S11). Also, the relay device 30 accepts the usage request from the printer 50 (S12). When the relay device 30 accepts the usage request, it sends the usage environment information δ of the printer 50 and the usage environment information γ of the relay device 30 to the management device 10 along with the usage request or separately (S13).

When the management device 10 receives the usage request, it generates the LT of the bulk mode including a lot of usage rules based on the usage environment information δ of the printer 50, the usage environment information γ of the relay device 30 and the usage request (S14) (See FIG. 23B), and transfers the generated LT of the bulk mode to the relay device 30 (S15).

When the relay device 30 receives the LT, it sees the control mode of the LT to confirm that it is the bulk mode (B), selects one usage rule among a bulk of many usage rules (S16) and transfers the LT including the selected usage rule to the SD card 40 (S17).

As a result, the license information indicating a plurality of potential usage rules in various usage manners is distributed even if the management device cannot comprehend the usage environment of the terminal device, the most suitable usage rule for the terminal device is selected among them and transferred to the terminal device as the license information, and therefore, impairment of high capability of the terminal device can be avoided.

Note that the LT which is distributed from the management device 10 based on the request can be used directly on the terminal device connected to the network like the digital TV 20 without relay.

According to the present license management system 1, the LT which the management device 10 issues is distributed to the terminal device via the relay device 30, but the relay device may distribute the LT to the terminal device as in the case of the free usage LT. That is, the relay device may have a function of issuing an LT.

Furthermore, according to the above embodiment, the terminal device is applied to a transportable rendering device such as the digital TV 20, the relay device 30 and the printer 50, but it may be applied to a station kiosk, a fixed terminal located in a convenience store, etc.

On the other hand, the network 60 is applied to a digital broadcasting/communication satellite network and a broadband network, but it is not limited to these, and it can be applied to a home or corporate LAN and a WAN, of course.

INDUSTRIAL APPLICABILITY

As mentioned above, the management device, the relay device and the terminal device in the license management system can be applicable to a computer device such as a server, a set-top box, a personal computer, a digital TV, a printer, a mobile phone and a portable information terminal for distributing, relaying and receiving license information.

What is claimed is:

1. A license management system for distributing license information to a terminal device of a user, the license information allowing use of a content under a predetermined usage rule, the license management system comprising:
    a management device programmed to distribute the license information;
    a relay device programmed to receive the license information distributed from said management device and transfer the license information; and
    a terminal device programmed to receive the license information transferred from said relay device and use the content according to the license information,
    wherein said management device includes:
    a usage request analyzing unit programmed to obtain a usage request for the content from said terminal device via said relay device, and to analyze the obtained usage request;
    a usage environment information analyzing unit programmed to obtain, from said relay device, first usage environment information indicating a usage rule processing capability of said terminal device and second usage environment information indicating a usage rule processing capability of said relay device, and to analyze the obtained first and second usage environment information;
    a license information generating unit programmed to generate the license information including a usage rule corresponding to the analysis results of the usage request and the first and second usage environment information, the license information including sets of usage rules having different use formats and the same rights details;
    an instruction information generating unit programmed to generate instruction information indicating how to handle the license information in said relay device, based on a comparison result obtained by comparing the first usage environment information and the second usage environment information; and
    a license information sending unit programmed to embed the generated instruction information in the license information, and to send the license information to said relay device,
    wherein said relay device includes:
    a first usage environment information holding unit programmed to hold the first and second usage environment information:
    a first notifying unit programmed to notify said management device of the first and second usage environment information held by said first usage environment information holding unit;
    a license information receiving unit programmed to receive the license information sent from said management device in which the instruction information is embedded; and
    a transferring unit programmed to perform one of: (i) selecting at least one usable usage rule from a set of usage rules from the license information and transferring the at least one selected usage rule to said terminal device, when the instruction information embedded in the license information received from said management device indicates a first mode, and (ii) transferring the set of usage rules to said terminal device without selecting any usage rule, and
    wherein said instruction information generating unit in said management device is programmed to compare the first usage environment information and the second usage environment usage information, and determine the instruction information as one of
        a through mode which indicates that said relay device transmits the license information to said terminal device, when the usage rule processing capability of said terminal device is higher than the usage rule processing capability of said relay device,
        a normal mode which indicates that said relay device decrypts and transmits the license information to said terminal device, when the usage rule processing capability of said relay device is higher than the usage rule processing capability of said terminal device, and
        a bulk mode which indicates that the license information is expressed in a plurality of formats, when the first usage environment information is unclear because the first usage environment information cannot be understood, and
    said transferring unit in said relay device is programmed to
        when the instruction information in the license information received by said license information receiving unit indicates the through mode, transfer the received license information to said terminal device by passing the license information without performing any processing on the license information,
        when the instruction information indicates the normal mode, said license information receiving unit is programmed to decrypt the received license information and to transfer the decrypted license information to said terminal device, and
        when the instruction information indicates the bulk mode, said terminal device is programmed to select a usage rule for a license format that said terminal device can interpret from among the usage rules of a plurality of formats of the license information, to generate license information which includes only the selected usage rule and to transfer the license information to said terminal device.

2. The license management system according to claim 1, wherein
the content is encrypted,
the license information includes a key for decrypting the content, and
said terminal device includes:
a content holding unit in which the content is held;
a receiving unit programmed to receive the license information sent from said relay device; and
a copyright information processing unit programmed to decrypt the content held by said content holding unit using the key included in the license information received by said receiving unit.

3. The license management system according to claim 1, wherein the first and second usage environment information respectively include versions of said terminal device and said relay device, and
said instruction information generating unit is programmed to compare the version of said relay device with the version of said terminal device, and to generate the instruction information that indicates the through mode when the version of said terminal device is newer than the version of said relay device as a result of the comparison.

4. The license management system according to claim 1, wherein the first and second usage environment information respectively include content usage types which are to be handled in said terminal device and said relay device and numbers of uses of the respective content usage types, and
said instruction information generating unit is programmed to compare the content usage type and the number of uses of the content usage type by said relay device with the content usage type and the number of uses of the content usage type by said terminal device, and to generate, as result of the comparison, the instruction information that indicates the through mode when (i) said relay device does not support the content usage type of said terminal device, or (ii) the number of uses by said terminal device is more than the number of uses which said relay device supports.

5. The license management system according to claim 2, wherein said instruction information generating unit is programmed to generate the instruction information that indicates the bulk mode when the first usage environment information of said terminal device is unknown.

6. The license management system according to claim 1, wherein said terminal device includes:
a second usage environment information holding unit programmed to hold the first usage environment information of said terminal device in advance; and
a second notifying unit programmed to notify said relay device of the first usage environment information of said terminal device which is read out from said second usage environment information holding unit.

7. The license management system according to claim 1, wherein said management device further includes:
an encrypting unit programmed to encrypt at least a part of the license information; and
said terminal device further includes a first decrypting unit programmed to decrypt the encrypted part of the license information.

8. The license management system according to claim 7, wherein said encrypting unit embeds the license information in the content, as digital watermark data.

9. The license management system according to claim 7, wherein said relay device further includes:
a second decrypting unit programmed to decrypt the encrypted part of the received license information;
a judging unit programmed to judge whether or not the usage rule of the decrypted license information includes free information indicating no usage restraint;
a re-encrypting unit programmed to re-encrypt a part of the usage rule when said judging unit judges that free information is included in the usage rule; and
a storing unit programmed to store license information including the usage rule which is encrypted by said re-encrypting unit.

10. The license management system according to claim 1, wherein the license information is binary data.

11. The license management system according to claim 1, wherein the license information is data which is described in markup language.

12. The license management system according to claim 1, wherein the set of usage rules includes a usage rule containing one right allowing the content to be used n times, and a usage rule containing n rights allowing the content to be used only once.

13. The license management system according to claim 12, wherein the set of usage rules includes a usage rule containing one right allowing the content to be reproduced, copied, moved, or printed n times, and a usage rule containing n rights each allowing the content to be reproduced, copied, moved or printed only once.

14. A management device for distributing license information to a terminal device of a user requesting use of a content via a communication network and a relay device, the license information allowing use of the content under a predetermined usage rule, the license management device comprising:
a usage request analyzing unit programmed to obtain a usage request for a content from the terminal device via the relay device, and to analyze the obtained usage request;
a usage environment information analyzing unit programmed to obtain, from the relay device, first usage environment information indicating a usage rule processing capability of the terminal device and second usage environment information indicating a usage rule processing capability of the relay device, and to analyze the obtained first and second usage environment information;
a license information generating unit programmed to generate license information including a usage rule corresponding to the analysis results of the usage request and the first and second usage environment information, the license information including sets of usage rules having different use formats and the same rights details;
an instruction information generating unit programmed to generate instruction information indicating how to handle the license information in the relay device, based on a comparison result obtained by comparing the first usage environment information and the second usage environment information; and a license information sending unit programmed to embed the generated instruction information in the license information, and to send the license information to the relay device, wherein said instruction information generating unit is programmed to compare the first usage environment information and the second usage environment usage information, and determine the instruction information as one of a through mode which indicates that the relay device transmits the license information to the terminal device, when the usage rule processing capability of the terminal device is higher than the usage rule processing capability of the relay device, a normal mode which indicates that the relay device decrypts and transmits the license information to the terminal device, when the usage rule processing capability of the relay device is higher than the usage rule processing capability of the terminal device, and a bulk mode which indicates that the license information is expressed in a plurality of formats, when the first usage environment information is unclear because the first usage environment information cannot be understood.

15. A license management method for a system for distributing license information from a management device to a terminal device of a user requesting use of a content, via a communication network and a relay device, the license information allowing use of the content under a predetermined usage rule, the license management method comprising:

obtaining a usage request of a content from the terminal device via the relay device, and analyzing the obtained usage request, in the management device;

obtaining, from the relay device, first usage environment information indicating a usage rule processing capability of the terminal device and second usage environment information indicating a usage rule processing capability of the relay device, and analyzing the obtained first and second usage environment information, in the management device;

generating license information including a usage rule corresponding to the analysis results of the usage request and the first and second usage environment information, in the management device, the license information including sets of usage rules having different use formats and the same rights details;

generating instruction information indicating how to handle the license information in the relay device based on a comparison result obtained by comparing the first usage environment information and the second usage environment information, in the management device;

embedding the generated instruction information in the license information, and sending the license information to the relay device, in the management device;

holding, in the terminal device, the first and second usage environment information;

notifying, in the terminal device, the management device of the first and second usage environment information;

receiving the license information sent from the management device in which the instruction information is embedded, in the relay device; and performing, in the relay device, one of: (i) selecting at least one usable usage rule from a set of usage rules from the license information and transferring the at least one selected usage rule to the terminal device, when the instruction information embedded in the license information received from the management device indicates a first mode, and (ii) transferring the set of usage rules to the terminal device without selecting any usage rule, wherein said generating of the instruction information, in the management device, includes comparing the first usage environment information and the second usage environment usage information, and determining the instruction information as one of a through mode which indicates that the relay device transmits the license information to said terminal device, when the usage rule processing capability of the terminal device is higher than the usage rule processing capability of the relay device, a normal mode which indicates that the relay device decrypts and transmits the license information to said terminal device, when the usage rule processing capability of the relay device is higher than the usage rule processing capability of the terminal device, a bulk mode which indicates that the license information is expressed in a plurality of formats, when the first usage environment information is unclear because the first usage environment information cannot be understood, and said performing, in the relay device, includes when the instruction information in the license information indicates the through mode, transferring the received license information to the terminal device by passing the license information without performing any processing on the license information, when the instruction information indicates the normal mode, decrypting the received license information and transferring the decrypted license information to the terminal device, and when the instruction information indicates the bulk mode, selecting a usage rule for a license format that the terminal device can interpret from among the usage rules of a plurality of formats of the license information, to generate license information which includes only the selected usage rule and to transfer the license information to the terminal device.

16. A program embodied on a computer readable medium for use in a management device for distributing license information to a terminal device of a user requesting use of a content via a communication network and a relay device, the license information allowing use of the content under a predetermined usage rule, the program causing a computer to execute:

obtaining a usage request of a content from the terminal device via the relay device, and analyzing the obtained usage request;

obtaining, from the relay device, first usage environment information indicating a usage rule processing capability of the terminal device and second usage environment information indicating usage rule processing capability of the relay device, and analyzing the obtained first and second usage environment information;

generating license information including a usage rule corresponding to the analysis results of the usage request and the first and second usage environment information, the license information including sets of usage rules having different use formats and the same rights details;

generating instruction information indicating how to handle the license information in the relay device based on a comparison result obtained by comparing the first usage environment information and the second usage environment information; and embedding the generated instruction information in the license information, and sending the license information to the relay device, wherein said generating of the instruction information includes comparing the first usage environment information and the second usage environment usage information, and determining the instruction information as one of a through mode which indicates that the relay device transmits the license information to said terminal device, when the usage rule processing capability of the terminal device is higher than the usage rule processing capability of the relay device, a normal mode which indicates that the relay device decrypts and transmits the license information to said terminal device, when the usage rule processing capability of the relay device is higher than the usage rule processing capability of the terminal device, a bulk mode which indicates that the license information is expressed in a plurality of formats, when the first usage environment information is unclear because the first usage environment information cannot be understood.

* * * * *